United States Patent
Miyamoto et al.

(10) Patent No.: US 6,709,112 B2
(45) Date of Patent: Mar. 23, 2004

(54) LIGHT SOURCE DEVICE AND PROJECTION TYPE DISPLAY CAPABLE OF ENCLOSING FRAGMENT HEREIN IN CASE OF BURST OF DISCHARGE LAMP DURING LIGHTING

(75) Inventors: Teruo Miyamoto, Tokyo (JP);
Hideharu Tanaka, Tokyo (JP);
Mitsuhiro Kawaguchi, Tokyo (JP);
Tatsuro Hirose, Tokyo (JP);
Toshimitsu Iwai, Tokyo (JP);
Tomohiro Bessho, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/268,762

(22) Filed: Oct. 11, 2002

(65) Prior Publication Data

US 2003/0071977 A1 Apr. 17, 2003

(30) Foreign Application Priority Data

Oct. 11, 2001 (JP) ........................ 2001-313481
Apr. 4, 2002 (JP) ........................ 2002-102067

(51) Int. Cl.$^7$ .......................... G03B 21/18; F21V 29/00
(52) U.S. Cl. .......................... 353/57; 353/61; 362/218; 362/294; 362/373
(58) Field of Search .............. 353/52, 57, 61; 362/217, 225, 294, 373, 218

(56) References Cited

U.S. PATENT DOCUMENTS 5,290,149 A * 3/1994 Vieth .......................... 416/188
6,494,581 B2 * 12/2002 Shimizu ...................... 353/61
6,509,674 B1 * 1/2003 Nakagawa .................. 313/113

FOREIGN PATENT DOCUMENTS

| JP | 10-223023 A | 8/1998 |
|---|---|---|
| JP | 2001-290219 A | 10/2001 |

* cited by examiner

Primary Examiner—Russell Adams
Assistant Examiner—Michael Dalakis
(74) Attorney, Agent, or Firm—Birch, Stewart, Kolasch & Birch, LLP

(57) ABSTRACT

It is an object to obtain a light source device and a projection type display device in which a fragment can be completely enclosed therein even if a discharge lamp bursts during lighting. During normal lighting of a discharge lamp (1), an internal space of a light source device (10) and an external space are spatially connected to each other through a vent hole (43) formed on a cutoff valve mechanism (45) and a vent hole (100) formed on a concave reflecting mirror (4). Cooling air is introduced and discharged between the internal space and the external space so that the discharge lamp (1) is cooled down. When the discharge lamp (1) bursts during lighting for some reason, a very strong impulsive pressure wave is generated in a moment of the burst. The pressure wave presses a movable valve (41) provided in the cutoff valve mechanism (45) through the vent hole (100). By the pressing carried out with the pressure wave, the movable valve (41) is pushed up in a direction of an arrow (K1), thereby closing the vent hole (43).

20 Claims, 21 Drawing Sheets

LIGHT SOURCE DEVICE AND PROJECTION TYPE DISPLAY CAPABLE OF ENCLOSING FRAGMENT HEREIN IN CASE OF BURST OF DISCHARGE LAMP DURING LIGHTING

This nonprovisional application claims priority under 35 U.S.C. § 119(a) on patent application No. 2001-313481 and 2002-102067 filed in JAPAN on Oct. 11, 2001 and Apr. 4, 2002, which is herein incorporated by reference.

BACKGROUND OF THE INVENTION

1. Field of the Invention

The present invention relates to a structure of a light source device using a discharge lamp and a structure of a projection type display device on which the light source device is mounted.

2. Description of the Background Art

As a light emitting source of a light source device to be mounted on a projection type display device such as a liquid crystal projector, a discharge lamp such as a high pressure mercury-vapor lamp or a metal halide lamp has often been used. Since the discharge lamp of this kind has a very high internal pressure during lighting, it rarely bursts during lighting. There is a danger if the discharge lamp bursts and a fragment thereof is thereby scattered to the outside of a light source device or the outside of a projection type display device. Therefore, a fragment scattering prevention structure has conventionally been introduced into the light source device.

FIG. 19 is a perspective view showing an external structure of a conventional light source device, FIG. 20 is a sectional view showing a sectional structure taken along a virtual plane A in FIG. 19, and FIG. 21 is a sectional view showing a sectional structure taken along a virtual plane B in FIG. 19 (see Japanese Patent Application Laid-Open No. 10-223023 (1998)). In FIGS. 19 to 21, the reference numeral 1 denotes a discharge lamp, the reference numeral 2 denotes a base, the reference numeral 3 denotes a feeder, the reference numeral 4 denotes a concave reflecting mirror, the reference numeral 5 denotes a front plate formed of a translucent material, the reference numeral 6 denotes a sleeve, the reference numeral 7 denotes an adhesive, the reference numeral 8 denotes a wire net, the reference numeral 9 denotes a cervical portion, the reference numerals 100 to 102 denote vent holes, the reference numeral 10 denotes a whole light source device, and a line C1–C2 denotes a center of an optical axis.

Next, description will be given to the structure and operation of the light source device 10. The discharge lamp 1 fixed to the base 2 is inserted in the cervical portion 9 of the concave reflecting mirror 4. The base 2 is fixed to the sleeve 6 with the adhesive 7. The sleeve 6 is fixed to the concave reflecting mirror 4 with the adhesive 7 after the optical axis C1–C2 is adjusted. The front plate 5 to be a light emitting surface is bonded and fixed to an opening on the light emitting side of the concave reflecting mirror 4. A container surrounding the discharge lamp 1 is constituted by the concave reflecting mirror 4 and the front plate 5. The vent hole 100 is formed on a peripheral edge of the opening on the light emitting side of the concave reflecting mirror 4 (see FIG. 20), and the wire net 8 is provided over the vent hole 100. While the vent hole is provided in four places of the concave reflecting mirror in the Japanese Patent Application Laid-Open No. 10-223023 (1998), the vent hole in only one place is shown for simplicity of the drawing.

A partial nick is provided on the sleeve 6, thereby forming the vent holes 101 and 102. Cooling air is introduced and discharged through the vent holes 100 to 102 between an internal space of the light source device 10 (an internal space of the container constituted by the concave reflecting mirror 4 and the front plate 5) and an external space so that the discharge lamp 1 is cooled down.

In the case in which the discharge lamp 1 bursts during lighting, a fragment thereof is enclosed in the light source device 10 by means of the front plate 5 and the wire net 8 provided over the vent hole 100. Such a structure has widely been applied to a current main light source device such as a projection type display device.

FIG. 22 is a perspective view showing an external structure of a conventional projection type display device, FIG. 23 is a front view showing a structure of an axial flow fan mounted on the conventional projection type display device, and FIG. 24 is a perspective view showing an internal structure of the conventional projection type display device. In FIG. 22, the reference numeral 501 denotes a projection lens, the reference numeral 502 denotes an operation panel, the reference numeral 504 denotes an axial flow fan, the reference numeral 510 denotes a projecting luminous flux and the reference numeral 500 denotes a whole projection type display device. In FIG. 23, moreover, the reference numeral 506 denotes a fan case, the reference numeral 507 denotes a rotation axis of a wing, the reference numerals 504a and 504b denote fan wings which are adjacent to each other, and the reference numeral 504 denotes the whole axial flow fan. In FIG. 24, furthermore, the reference numeral 519 denotes an optical synthesizing prism, the reference numeral 520 denotes a power supply device, the reference numeral 521 denotes a cooling fan, the reference numeral 522 denotes an electronic circuit board, the reference numeral 523 denotes an optical system, the reference numeral 524 denotes a light bulb, and the reference numeral 525 denotes a light source device housing. In FIG. 24, the same reference numerals as those in FIG. 22 denote the same or corresponding portions.

Next, an operation will be described with reference to FIGS. 22 and 24. When a power switch provided on the operation panel 502 is turned ON, a discharge lamp of a light source device provided in the light source device housing 525 is lighted up. A light emitted from the discharge lamp is controlled by the optical system 523 so that the light bulb 524 representing an image to be displayed is illuminated. The image formed by the light bulb 524 is synthesized by the optical synthesizing prism 519 and is changed into the projecting luminous flux 510 by means of the projection lens 501, and is thus projected onto a display surface such as a screen. When the discharge lamp is lighted up, the axial flow fan 504 is operated for cooling the discharge lamp. When the axial flow fan 504 has such a wing structure that a great clearance 504ab is provided between the wings 504a and 504b adjacent to each other in an orthogonal projected image obtained by orthogonal projection in a direction of the rotation axis 507 of the wing (a perpendicular direction to the paper) (when the wing is projected onto a projecting surface perpendicular to the rotation axis 507 by parallel rays with the rotation axis 507 of the wing).

The conventional light source device 10 has the above-mentioned structure. For this reason, there is a problem in that a smaller fragment than a dimension of meshes of the wire net 8 or a smaller fragment than a clearance provided between the discharge lamp 1 and an internal surface of the cervical portion 9 is scattered to the outside of the light source device 10 at a wind pressure applied at time of a burst and cannot be completely enclosed in the light source device 10.

Moreover, since the conventional projection type display device 500 has the above-mentioned structure, there is a problem in that a fragment coming out of the light source device easily passes through the clearance 504ab between the wings of the fan 504 toward the outside when the discharge lamp bursts during lighting for some reason.

SUMMARY OF THE INVENTION

It is an object of the present invention to provide a light source device and a projection type display device which can completely enclose a fragment therein even if a discharge lamp bursts during lighting.

A first aspect of the present invention is directed to a light source device comprising a discharge lamp, a container, a first vent hole and a cutoff mechanism. The container is provided to surround the discharge lamp and partially has a translucent light emitting surface. The first vent hole is provided in the container. The cutoff mechanism has a movable member for being pressed by a pressure wave applied from an internal space of the container to cut off a spatial connection of the internal space and an external space through the first vent hole, and is provided in the vicinity of the first vent hole.

When the discharge lamp bursts, the movable member of the cutoff mechanism is pressed by the pressure wave generated at time of the burst so that the spatial connection between the internal space of the container and the external space is cut off. Consequently, it is possible to prevent a fragment of the discharge lamp from being scattered to the external space of the container.

A second aspect of the present invention is directed to a light source device comprising a discharge lamp, a concave reflecting mirror, a fixing member, a box member and a movable member. The concave reflecting mirror is disposed with the discharge lamp provided therein. The fixing member has a first vent hole to be spatially connected to an internal space of the concave reflecting mirror and serves to position and fix the discharge lamp and the concave reflecting mirror to each other. The box member has a second vent hole to be spatially connected to the first vent hole and is disposed with the fixing member provided therein. The movable member is provided in the box member in the vicinity of the second vent hole and is pressed by a pressure wave applied from the internal space, thereby cutting off a spatial connection of the internal space and an external space of the box member through the first and second vent holes.

When the discharge lamp bursts, the movable member is pressed by the pressure wave generated at time of the burst to close the second vent hole. Consequently, the spatial connection between the internal space of the concave reflecting mirror and the external space of the box member is cut off. Accordingly, it is possible to prevent a fragment of the discharge lamp from being scattered to the external space.

A third aspect of the present invention is directed to a projection type display device comprising a light source device, a light bulb, an optical system and a projection lens. The light bulb represents an image to be displayed. The optical system irradiates a light emitted from the light source device on the light bulb. The projection lens projects, onto a display surface, the image of the light bulb on which the light is irradiated. The light source device includes a discharge lamp, a container, a first vent hole and a cutoff mechanism. The container is provided to surround the discharge lamp and partially has a translucent light emitting surface. The first vent hole is provided in the container. The cutoff mechanism has a movable member for being pressed by a pressure wave applied from an internal space of the container to cut off a spatial connection of the internal space and an external space through the first vent hole, and is provided in the vicinity of the first vent hole.

It is possible to prevent a fragment of the discharge lamp provided in the light source device from being scattered to the external space of the projection type display device when the same discharge lamp bursts.

A fourth aspect of the present invention is directed to a projection type display device comprising a light source device, a light bulb, an optical system and a projection lens. The light bulb represents an image to be displayed. The optical system irradiates a light emitted from the light source device on the light bulb. The projection lens projects, onto a display surface, the image of the light bulb on which the light is irradiated. The light source device includes a discharge lamp, a concave reflecting mirror, a fixing member, a box member and a movable member. The concave reflecting mirror is disposed with the discharge lamp provided therein. The fixing member has a first vent hole to be spatially connected to an internal space of the concave reflecting mirror and serves to position and fix the discharge lamp and the concave reflecting mirror to each other. The box member has a second vent hole to be spatially connected to the first vent hole and is disposed with the fixing member provided therein. The movable member is provided in the box member in the vicinity of the second vent hole and is pressed by a pressure wave applied from the internal space, thereby cutting off a spatial connection of the internal space and an external space of the box member through the first and second vent holes.

It is possible to prevent a fragment of the discharge lamp provided in the light source device from being scattered to the external space of the projection type display device when the same discharge lamp bursts.

A fifth aspect of the present invention is directed to a projection type display device comprising a light source device, a light bulb, an optical system, a projection lens, a housing and an axial flow fan. The light source device has a discharge lamp. The light bulb represents an image to be displayed. The optical system irradiates a light emitted from the light source device on the light bulb. The projection lens projects, onto a display surface, the image of the light bulb on which the light is irradiated. The housing accommodates at least the light source device therein. The axial flow fan is provided in the housing and has a plurality of wings arranged around a rotation axis. The axial flow fan has such a wing configuration that a clearance is not provided between the wings which are adjacent to each other in an orthogonal projected image obtained by orthogonal projection in a direction of the rotation axis.

The axial flow fan has such a wing configuration that a clearance is not provided between the wings which are adjacent to each other in an orthogonal projected image. Even if a fragment of the discharge lamp provided in the light source device comes out of the light source device when the same discharge lamp bursts, therefore, it is possible to prevent the fragment from being scattered from the axial flow fan to an external space of the projection type display device.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
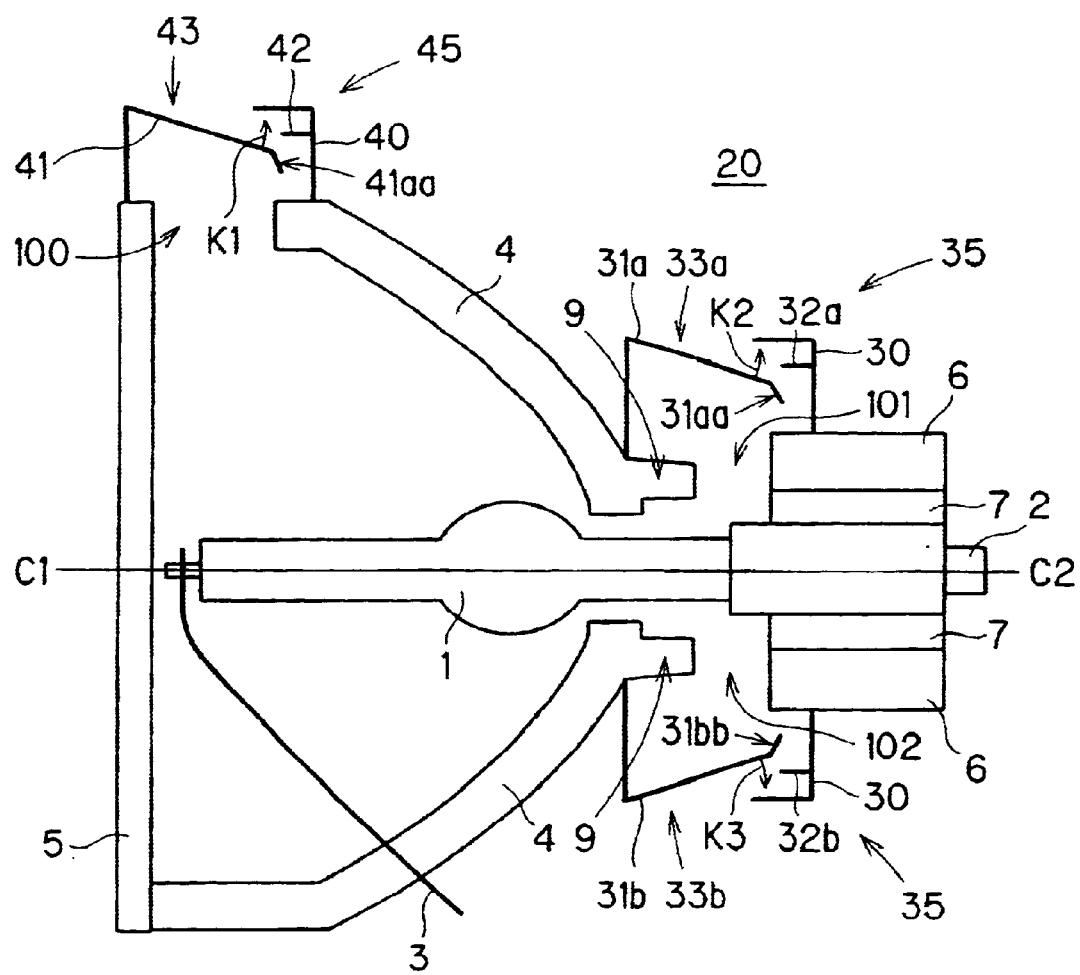
FIG. 1 is a sectional view showing a structure of a light source device according to a first embodiment of the present invention.
Figure 2:
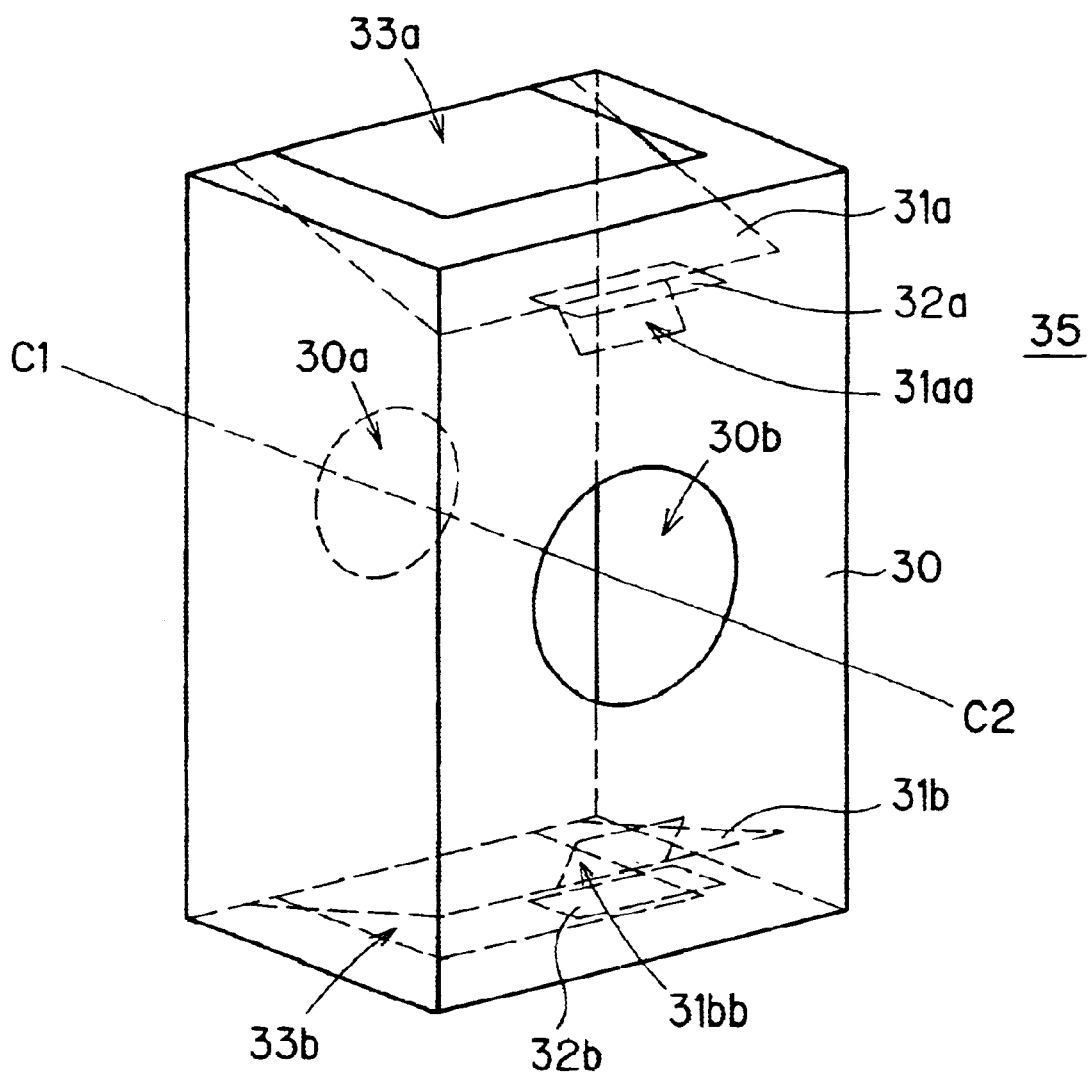
FIG. 2 is a perspective view showing a structure of a cutoff valve mechanism.
Figure 3:
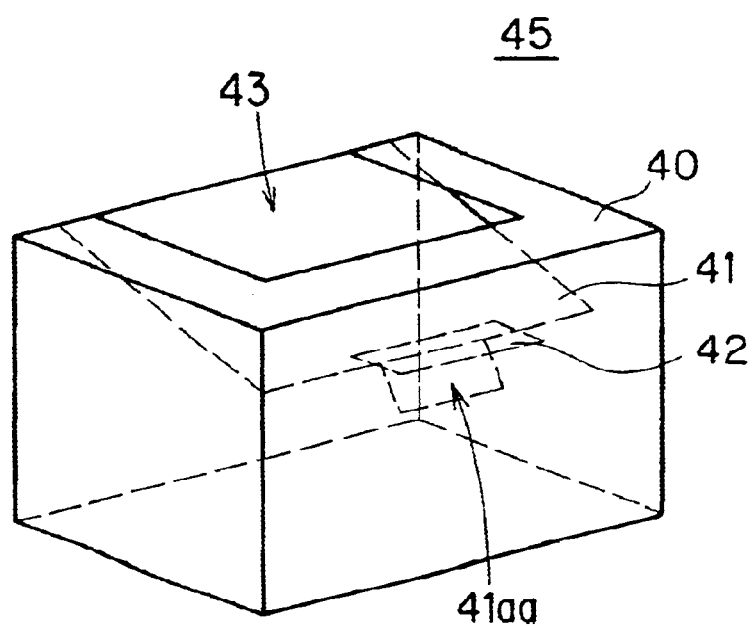
FIG. 3 is a perspective view showing a structure of another cutoff valve mechanism.
Figure 19:
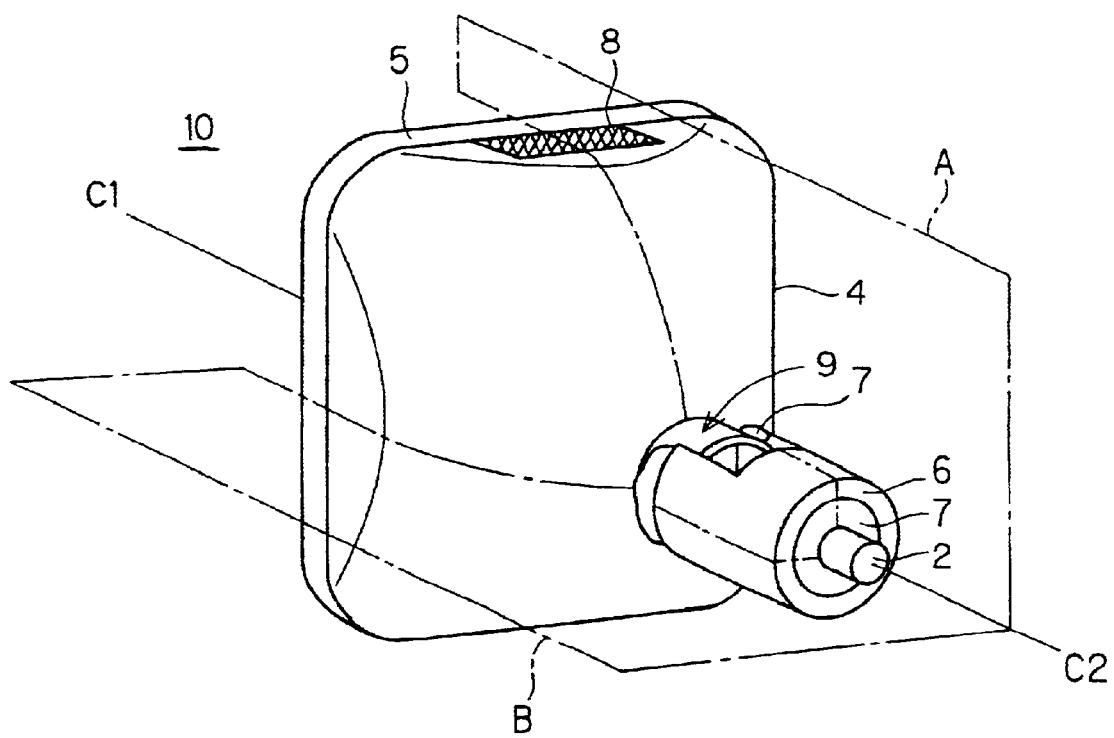
FIG. 19 is a perspective view showing an external structure of a conventional light source device.
Figure 20:
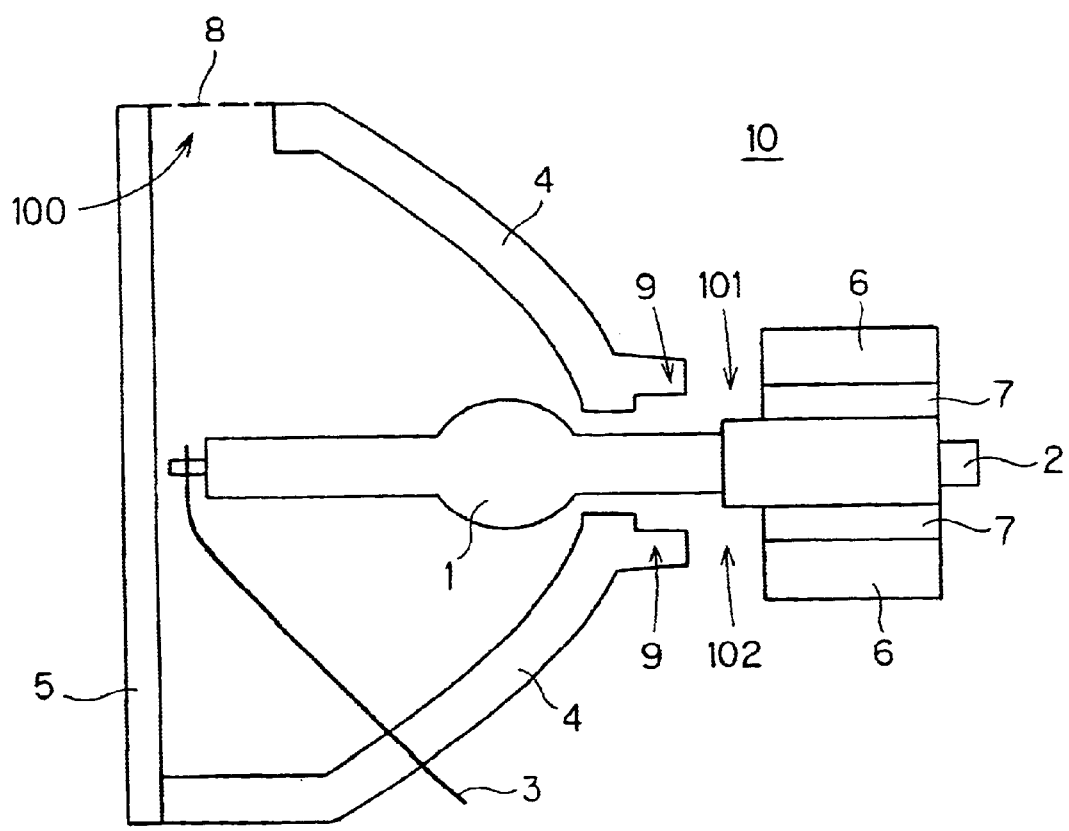
FIG. 20 is a sectional view showing a sectional structure taken along a virtual plane A in FIG. 19.
Figure 21:
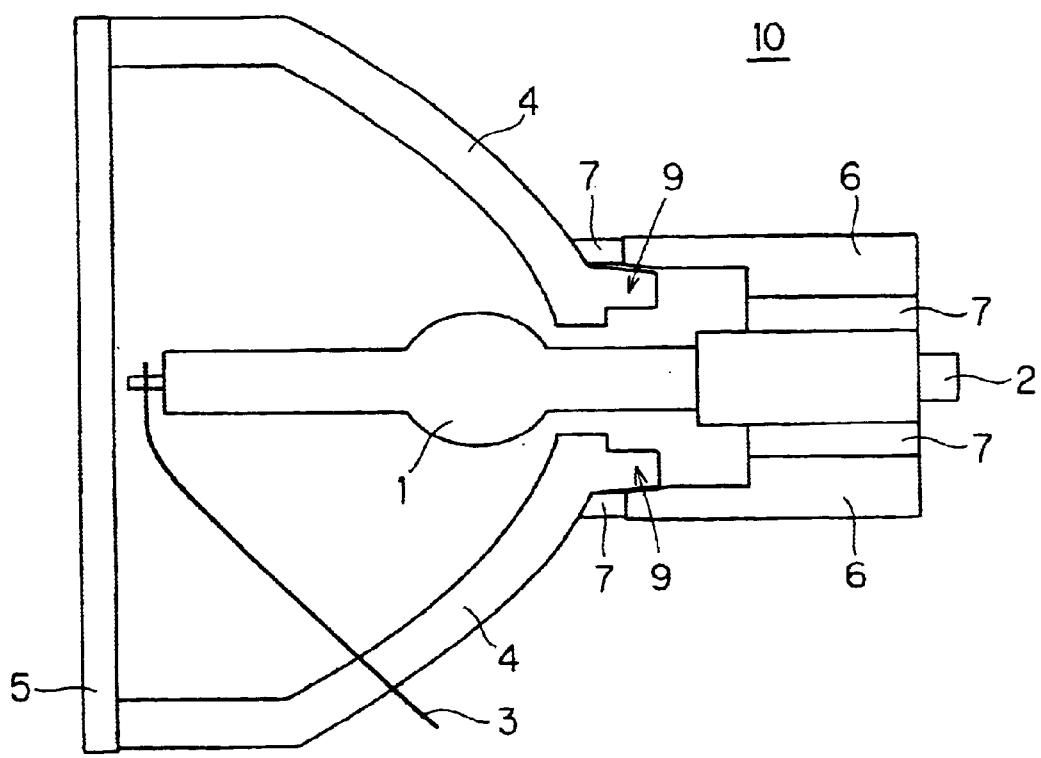
FIG. 21 is a sectional view showing a sectional structure taken along a virtual plane B in FIG. 19.

FIG. 1 is a sectional view showing a structure of a light source device according to a first embodiment of the present invention, FIG. 2 is a perspective view showing a structure of a cutoff valve mechanism 35 and FIG. 3 is a perspective view showing a structure of a cutoff valve mechanism 45. In FIGS. 1 to 3, the reference numerals 30 and 40 denote valve housings, the reference numerals 31a, 31b and 41 denote movable valves, the reference numerals 32a, 32b and 42 denote fixing clicks, the reference numerals 33a, 33b and 43 denote vent holes, and the reference numerals 35 and 45 denote cutoff valve mechanisms constituted by the valve housings, the movable valves and the fixing clicks. In FIG. 1, the same reference numerals as those in FIGS. 19 to 21 denote the same or corresponding portions.

Next, an operation will be described. During normal lighting of a discharge lamp 1, an internal space of a light source device 10 (an internal space of a container constituted by a concave reflecting mirror 4 and a front plate 5) and an external space are spatially connected to each other through the vent hole 43 formed on the cutoff valve mechanism 45 and a vent hole 100 formed on the concave reflecting mirror 4. Moreover, the internal space of the light source device 10 and the external space are spatially connected to each other through the vent holes 33a and 33b formed on the cutoff valve mechanism 35 and vent holes 101 and 102 formed on a sleeve 6. Cooling air is introduced and discharged between the internal space and the external space so that the discharge lamp 1 is cooled down.

It is assumed that the discharge lamp 1 bursts during lighting for some reason. A pressure in the discharge lamp 1 which is being lighted up is very highly increased to 100 to 200 atms. Therefore, a very strong impulsive pressure wave is generated in a moment of the burst. The pressure wave presses the movable valves 31a, 31b and 41 provided in the cutoff valve mechanisms 35 and 45 through the vent holes 100 to 102. By the pressing carried out with the pressure wave, the movable valves 31a, 31b and 41 are pushed upward in directions of arrows K2, K3 and K1 in FIG. 1 respectively, thereby closing the vent holes 33a, 33b and 43. More specifically, the spatial connection of the internal space of the light source device 10 and the external space is cut off. Projections 31aa, 31bb and 41aa are provided on tips of the movable valves 31a, 31b and 41 respectively, and are fitted in the fixing clicks 32a, 32b and 42 formed on internal surfaces of the valve housings 30 and 40. Consequently, the movable valves 31a, 31b and 41 are fixed with the vent holes 33a, 33b and 43 closed.

Figure 4:
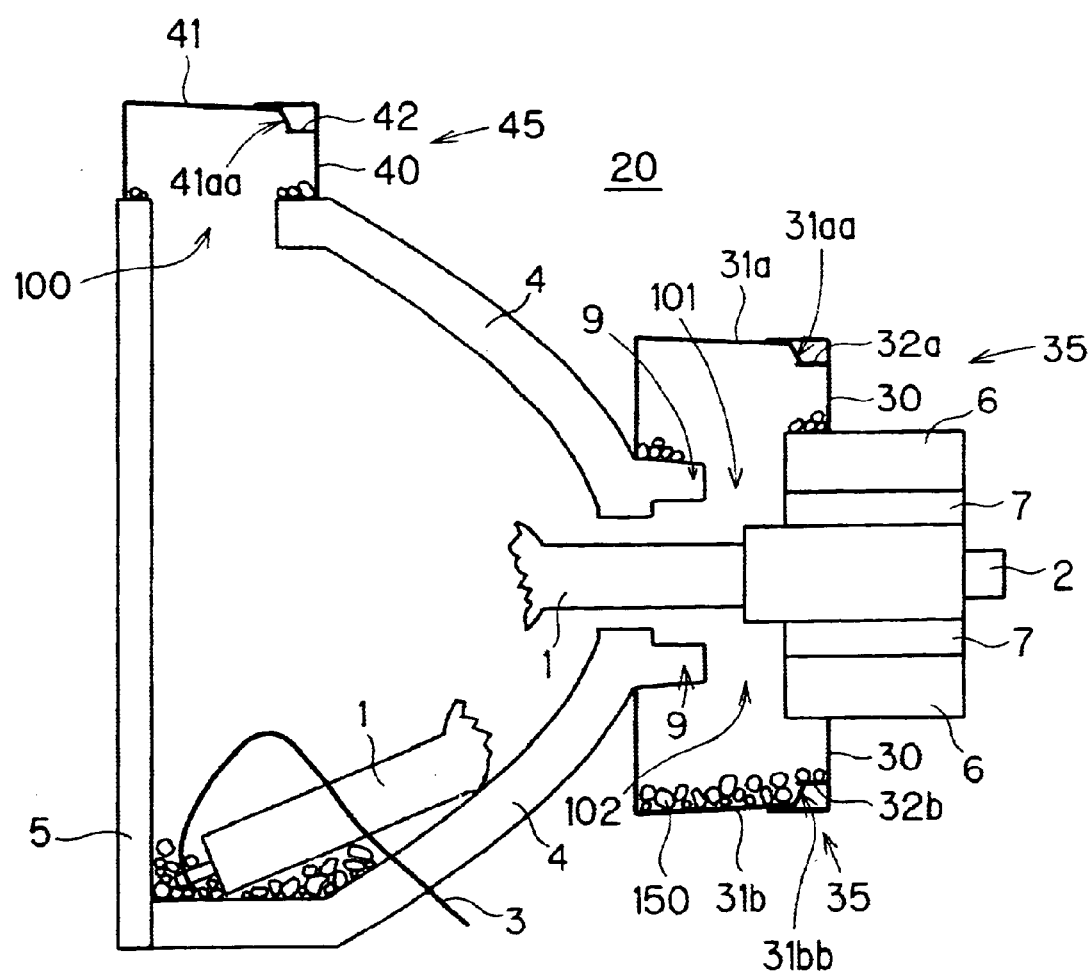
FIG. 4 is a sectional view showing a situation in which a discharge lamp bursts.

FIG. 4 is a sectional view showing a situation in which the discharge lamp 1 bursts. A fragment 150 of the discharge lamp 1 flies slightly later than the pressure wave on a time basis and then arrives at the vent holes 33a, 33b and 43. At this time, the movable valves 31a, 31b and 41 have already been closed. Therefore, the fragment 150 is completely enclosed in a light source device 20.

According to the light source device 20 in accordance with the first embodiment, thus, the fragment 150 of the discharge lamp 1 which is generated by the burst can be completely enclosed in the light source device 20. Accordingly, it is possible to prevent the fragment 150 of the discharge lamp 1 from being scattered to an external space of the light source device 20. Thus, it is possible to remarkably enhance reliability and safety of the light source device 20.

Second Embodiment

Figure 5:
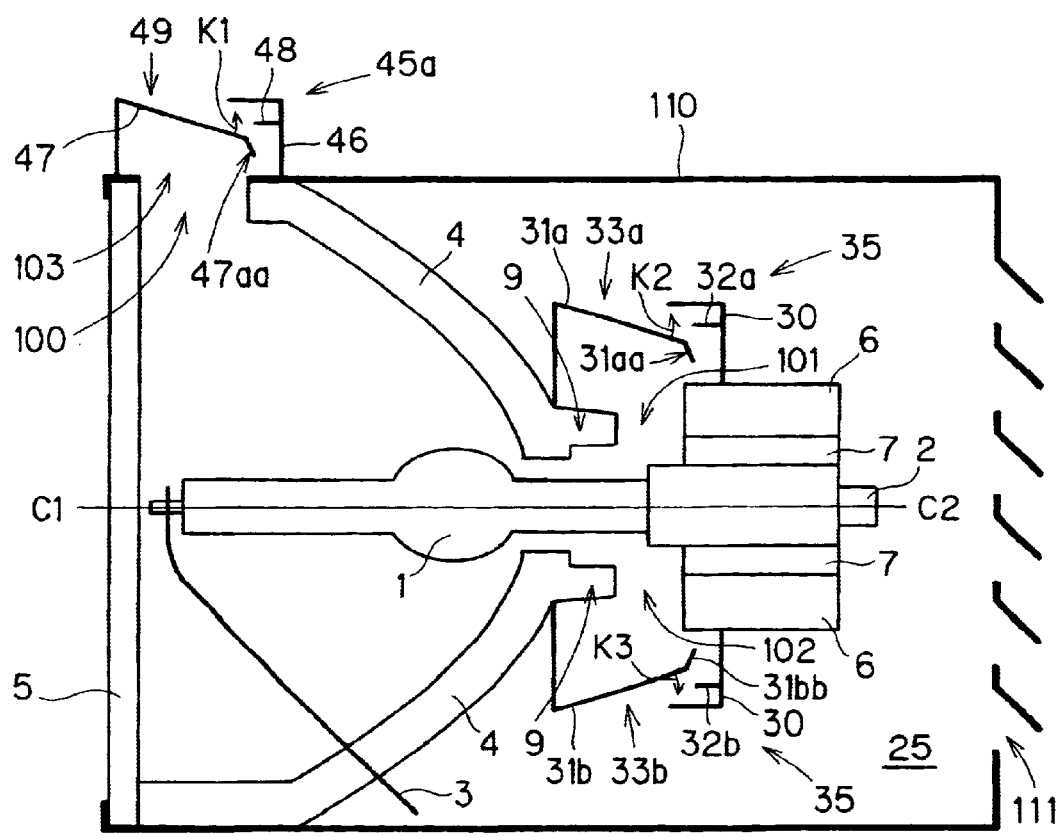
FIG. 5 is a sectional view showing a structure of a light source device according to a second embodiment of the present invention.

FIG. 5 is a sectional view showing a structure of a light source device according to a second embodiment of the present invention. In FIG. 5, the reference numeral 25 denotes a light source device, the reference numeral 46 denotes a valve housing, the reference numeral 47 denotes a movable valve, the reference numeral 48 denotes a fixing click, the reference numeral 49 denotes a vent hole, the reference numeral 45a denotes a cutoff valve mechanism constituted by the valve housing, the movable valve and the fixing click, the reference numeral 103 denotes a vent hole, the reference numeral 110 denotes a light source device housing, and the reference numeral 111 denotes a slit for ventilation. In FIG. 5, the same reference numerals as those in FIGS. 1 to 4 denote the same or corresponding portions.

In the second embodiment, the light source device 25 is provided in the light source device housing 110. The light source device housing 110 is provided to surround the light source device 25 excluding a front plate 5 to be a light emitting surface. The vent hole 103 to be matched with a vent hole 100 is formed on the light source device housing 110. Moreover, the cutoff valve mechanism 45a according to the second embodiment is obtained by providing, on the light source device housing 110, the cutoff valve mechanism 45 according to the first embodiment which is directly provided on the light source device 20.

During normal lighting of a discharge lamp 1, cooling air is introduced into and discharged from an inner part of a concave reflecting mirror 4 through the vent hole 49 formed on the cutoff valve mechanism 45a, the vent hole 103 formed on the light source device housing 110 and the vent hole 100 formed on the concave reflecting mirror 4 and through vent holes 101 and 102 provided on a sleeve 6, vent holes 33a and 33b provided on a cutoff valve mechanism 35 and the slit 111 for ventilation which is provided on the light source device housing 110 so that the discharge lamp 1 is cooled down.

Since an operation of the cutoff valve mechanism 45a is basically identical to that of the cutoff valve mechanism 45 described in the first embodiment, description will be omitted.

According to the light source device 25 in accordance with the second embodiment, thus, the cutoff valve mechanism 45a is provided on the light source device housing 110 in place of the light source device 25. Consequently, it is possible to reduce the number of components to be directly added to the light source device 25. Thus, the light source device 25 can be manufactured inexpensively with a simple structure.

Third Embodiment

Figure 6:
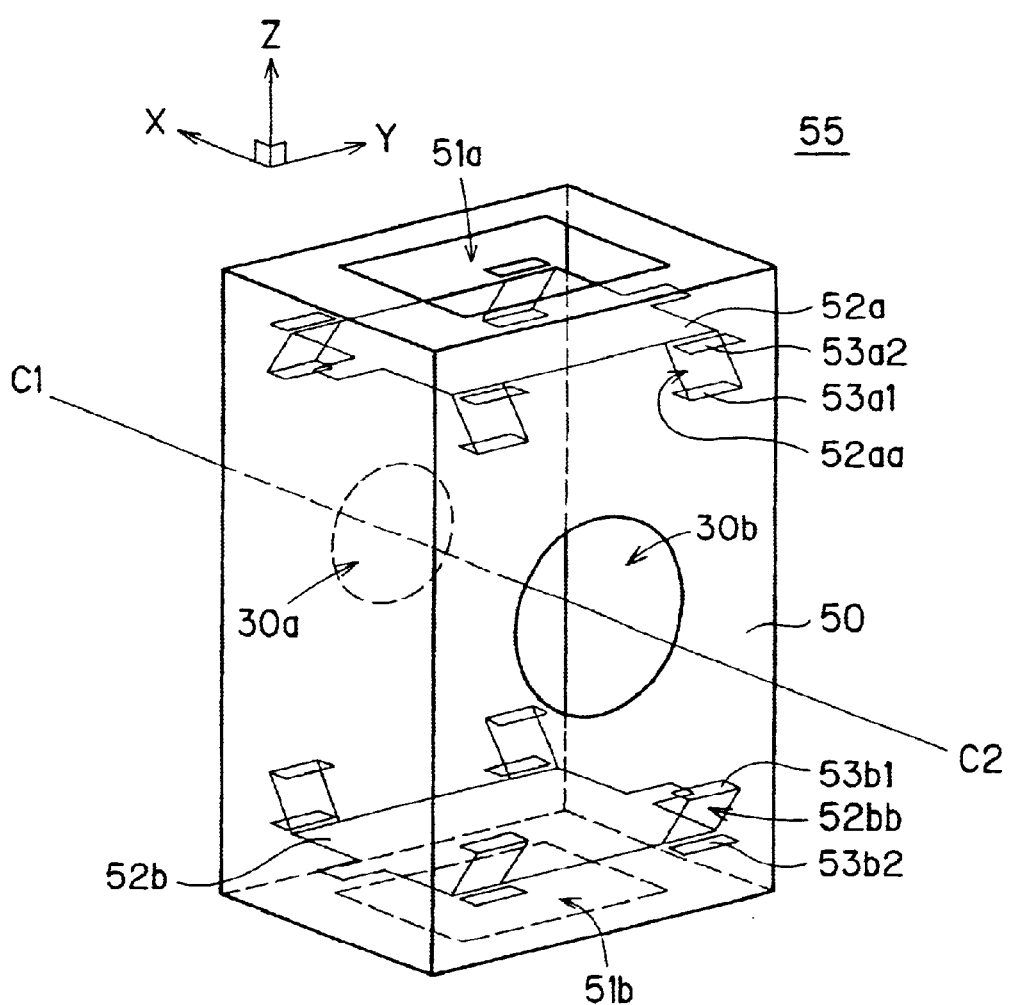
FIG. 6 is a perspective view showing a structure of a cutoff valve mechanism according to a third embodiment of the present invention.
Figure 7:
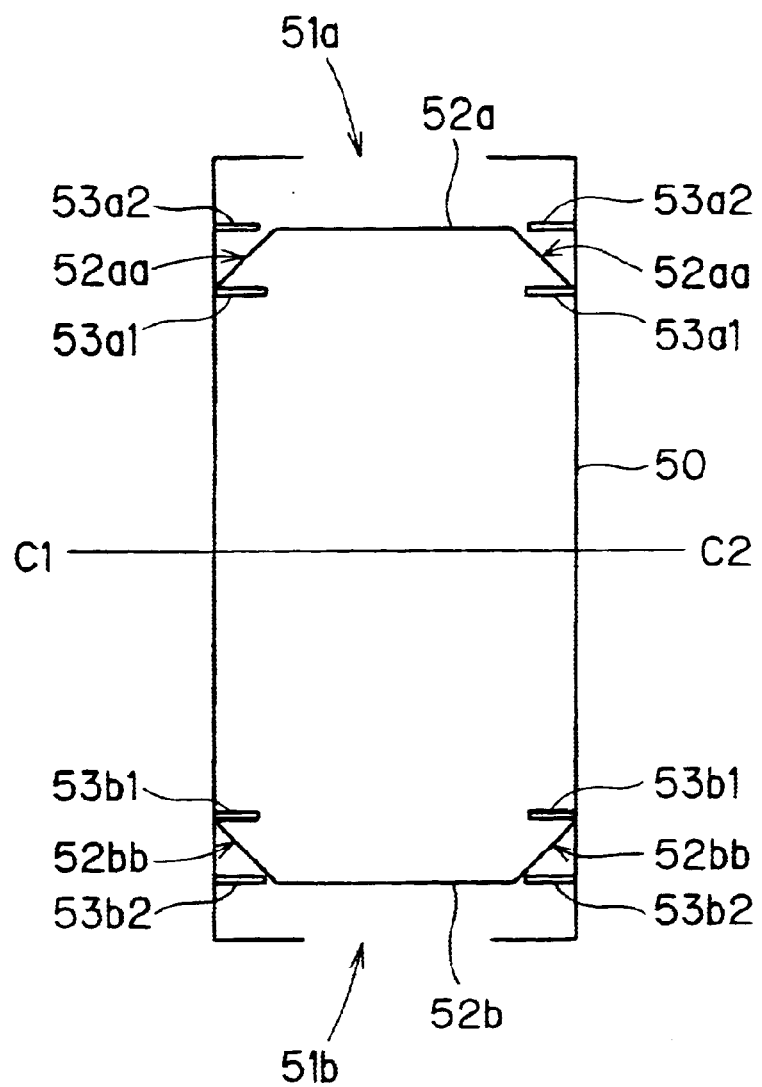
FIG. 7 is a sectional view related to an XZ plane of FIG. 6 in the structure illustrated in FIG. 6.
Figure 8:
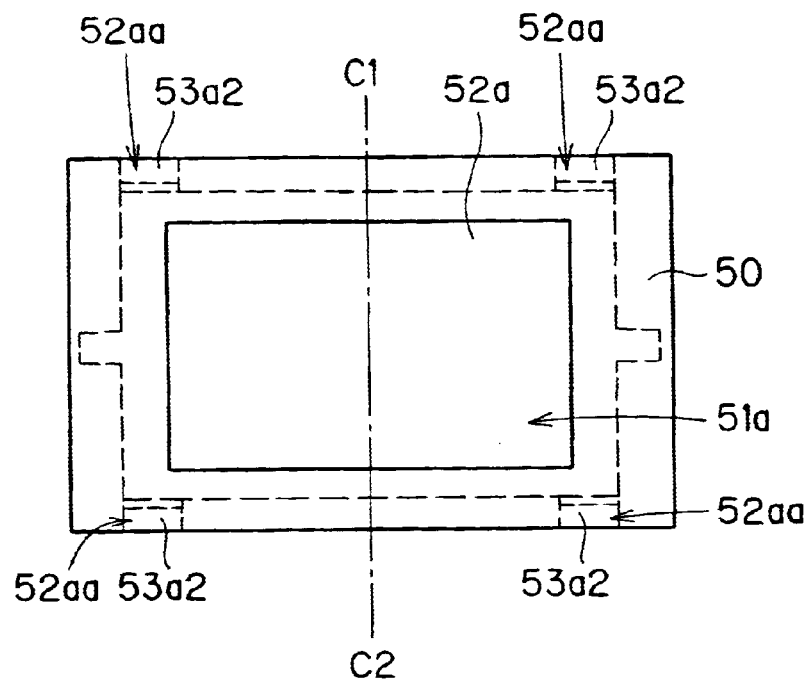
FIG. 8 is a top view showing the structure illustrated in FIG. 6.
Figure 9:
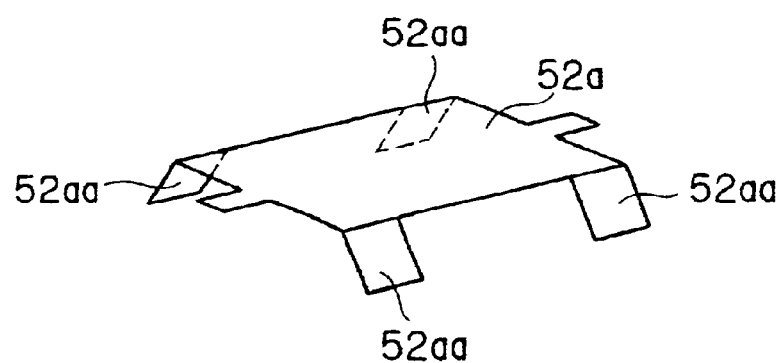
FIG. 9 is a perspective view showing a structure of a movable valve.

FIG. 6 is a perspective view showing a structure of a cutoff valve mechanism according to a third embodiment of the present invention. In FIG. 6, the reference numeral 50 denotes a valve housing, the reference numerals 51a and 51b denote vent holes, the reference numerals 52a and 52b denote movable valves, the reference numerals 53a1 and 53b1 denote fixing clicks, and the reference numeral 55 denotes a cutoff valve mechanism constituted by the valve housing, the movable valve and the fixing click. Moreover, FIG. 7 is a sectional view related to an XZ plane of FIG. 6 in the structure illustrated in FIG. 6, FIG. 8 is a top view showing the structure illustrated in FIG. 6, and FIG. 9 is a perspective view showing a structure of the movable valve 52a. The movable valve 52b is provided in such a state that the movable valve 52a is inverted vertically, and has the same structure as that of the movable valve 52a.

The valve housing 50 of the cutoff valve mechanism 55 is provided with the vent holes 51a and 51b for spatially connecting an external space of a light source device 20 to vent holes 101 and 102. The movable valves 52a and 52b are provided in the valve housing 50 in such a manner that rectangular main surfaces are opposed to the vent holes 51a and 51b without outer peripheries of the main surfaces coming in contact with the valve housing 50. When the movable valves 52a and 52b are pressed by a pressure wave, the vent holes 51a and 51b are closed by the main surfaces of the movable valves 52a and 52b. The movable valves 52a and 52b are fixed with fixing clicks 53a2 and 53b2 in that state, respectively.

According to the cutoff valve mechanism 55 in accordance with the third embodiment, thus, surroundings in four directions of the movable valves 52a and 52b can be used as a ventilation path and a sectional area for ventilation can be increased. Consequently, a cooling efficiency can be enhanced. It is apparent that the cutoff valve mechanism 45 may be used with the same structure.

Fourth Embodiment

Figure 10:
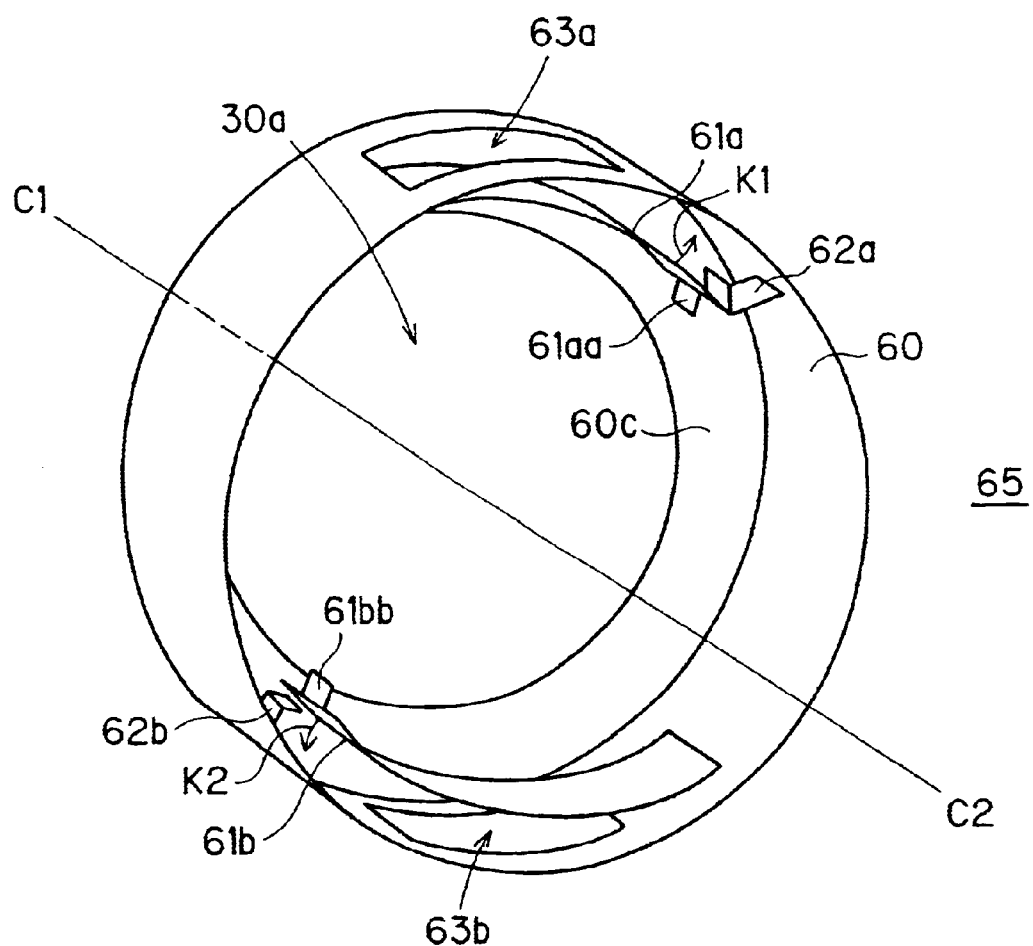
FIG. 10 is a perspective view showing a structure of a cutoff valve mechanism according to a fourth embodiment of the present invention.

FIG. 10 is a perspective view showing a structure of a cutoff valve mechanism according to a fourth embodiment of the present invention. In FIG. 10, the reference numeral 60 denotes a valve housing, the reference numerals 63a and 63b denote vent holes, the reference numerals 61a and 61b denote movable valves, the reference numerals 62a and 62b denote fixing clicks, and the reference numeral 65 denotes a cutoff valve mechanism constituted by the valve housing, the movable valve and the fixing click. Since an operation of the cutoff valve mechanism 65 according to the fourth embodiment is basically identical to that of the cutoff valve mechanism 35 according to the first embodiment, description will be omitted.

According to the cutoff valve mechanism 65 in accordance with the fourth embodiment, thus, a structure is simpler than that of the cutoff valve mechanism 35 in accordance with the first embodiment. Therefore, a manufacturing cost can be reduced, and furthermore, and a volume required for installation can be decreased so that a size of the whole device can be reduced.

While the cutoff valve mechanism is provided in all the vent holes (three places) in the first to fourth embodiments, a quantity and an installation place are not restricted thereto but the cutoff valve mechanism does not need to be always provided in all the vent holes based on the relationship with a peripheral structure of a light source device. By providing the cutoff valve mechanism corresponding to all the vent holes, it is possible to properly prevent a fragment of a discharge lamp from being scattered to an external space of the light source device.

Moreover, the cutoff valve mechanism is not restricted to the shape described in each of the first to fourth embodiments but it is possible to employ any structure in which the cutoff valve mechanism is constituted by a valve housing, a movable valve and a component for fixing the movable valve, the movable valve can be driven by a pressure wave generated at time of a burst and a vent hole can be held in a hermetic state.

Fifth Embodiment

Figure 22:
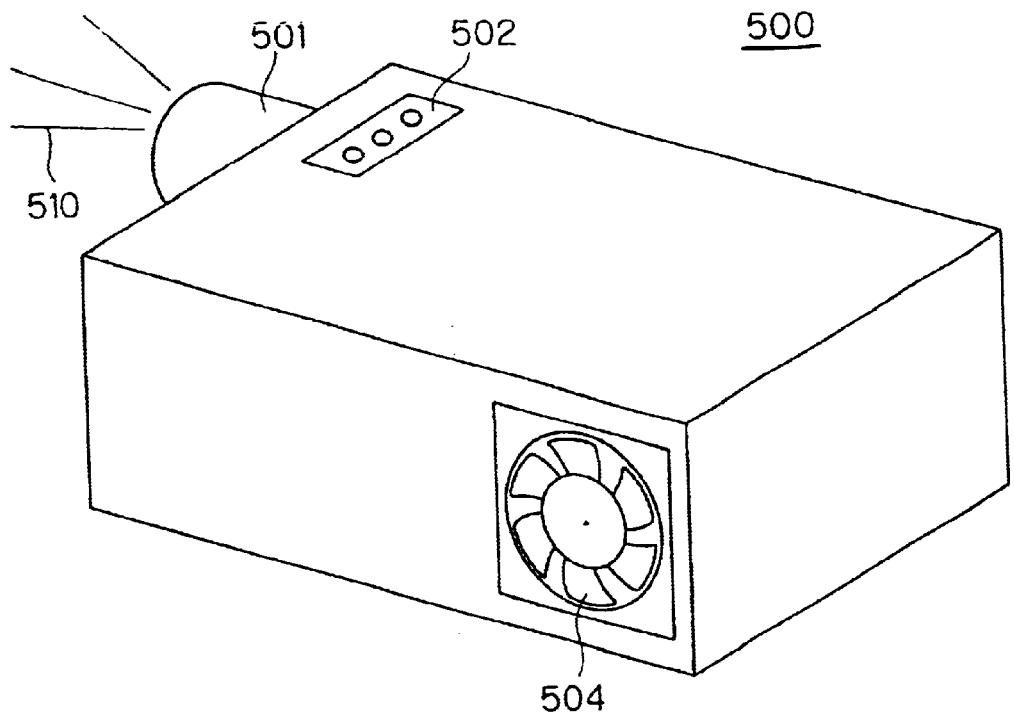
FIG. 22 is a perspective view showing an external structure of a conventional projection type display device.
Figure 24:
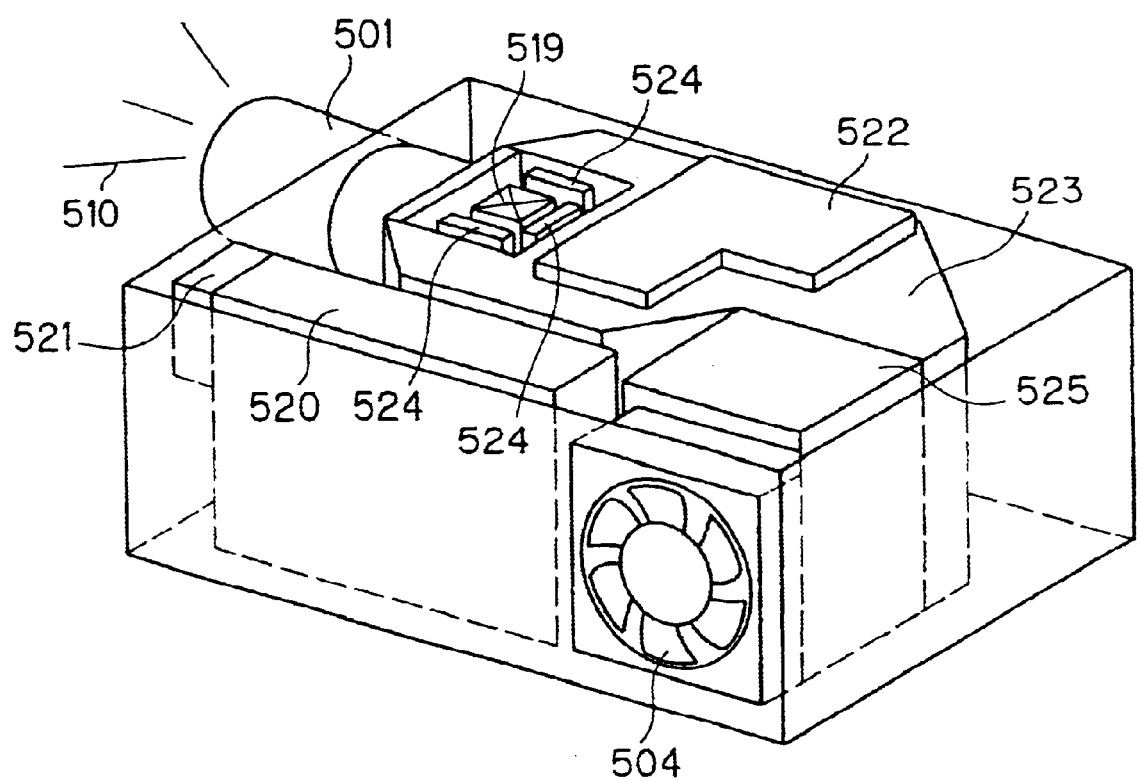
FIG. 24 is a perspective view showing an internal structure of the conventional projection type display device.

In the conventional projection type display device shown in FIGS. 22 and 24, the light source device comprising the cutoff valve mechanism according to each of the first to fourth embodiments or each of eighth to tenth embodiments which will be described below is mounted as a light source device.

According to a projection type display device in accordance with a fifth embodiment, even if a discharge lamp bursts, a fragment does not come out of the light source device. Therefore, it is possible to remarkably enhance reliability and safety of the projection type display device.

Sixth Embodiment

Figure 11:
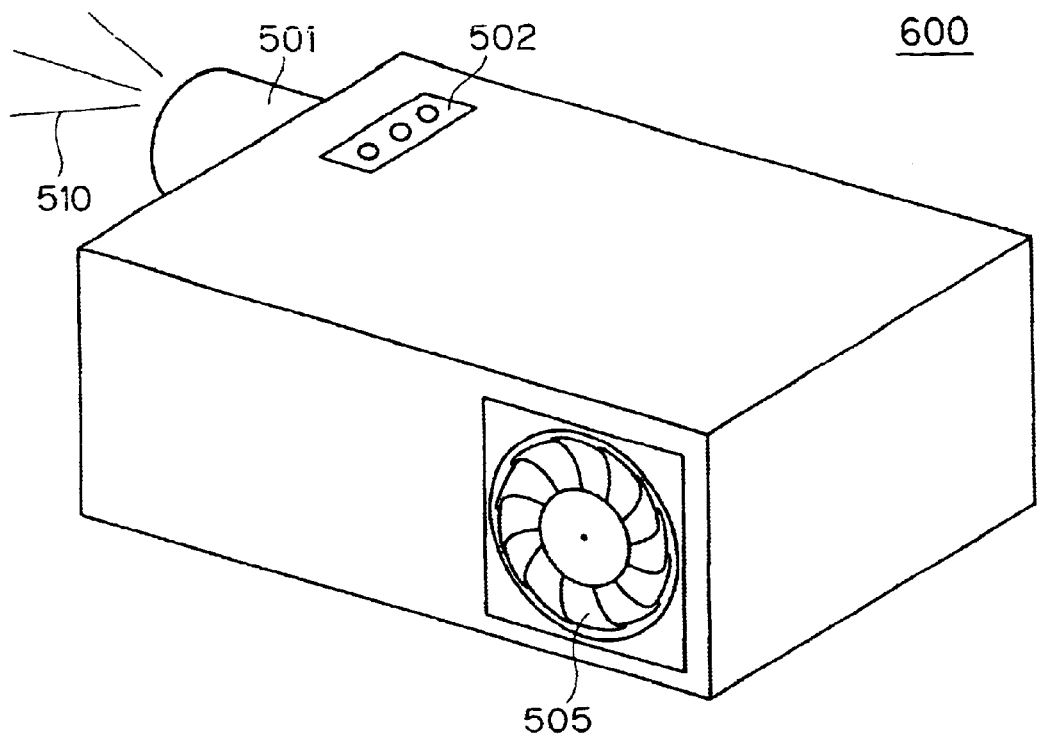
FIG. 11 is a perspective view showing an external structure of a projection type display device according to a sixth embodiment of the present invention.
Figure 12:
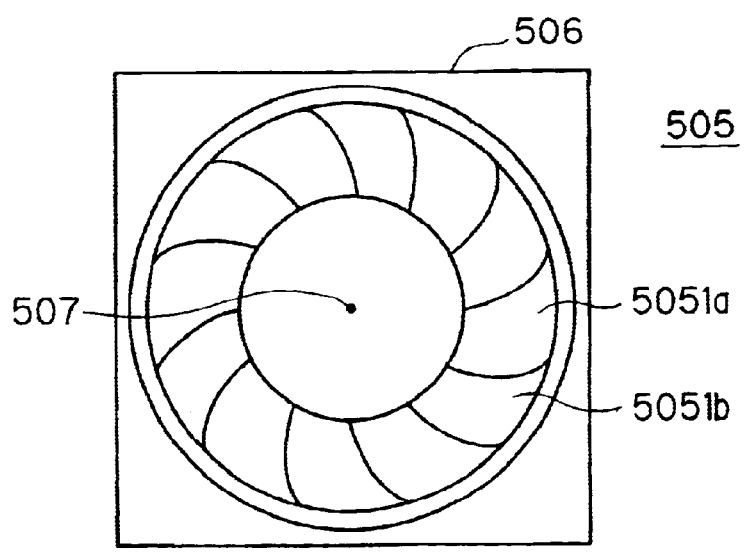
FIG. 12 is a front view showing a structure of an axial flow fan mounted on the projection type display device.
Figure 23:
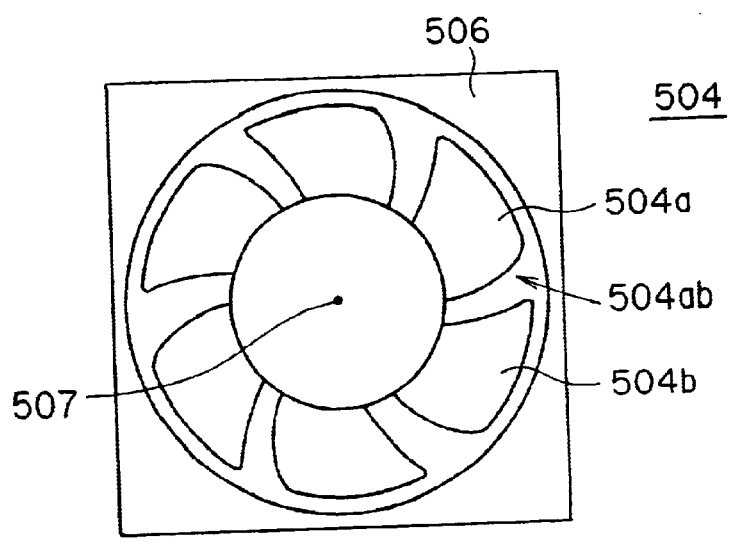
FIG. 23 is a front view showing a structure of an axial flow fan mounted on the conventional projection type display device.

FIG. 11 is a perspective view showing an external structure of a projection type display device according to a sixth embodiment of the present invention, and FIG. 12 is a front view showing a structure of an axial flow fan mounted on the projection type display device. In FIG. 12, the reference numerals 5051a and 5051b denote fan wings which are adjacent to each other, and the reference numeral 505 denotes the whole axial flow fan. In FIGS. 11 and 12, the same reference numerals as those in FIGS. 22 and 23 denote the same or corresponding portions. Moreover, since an internal structure of a projection type display device 600 according to the sixth embodiment is basically identical to that of the conventional projection type display device shown in FIG. 24, description will be omitted.

Next, an operation will be described with reference to FIGS. 11, 12 and 24. When a power switch provided on an operation panel 502 is turned ON, a discharge lamp in a light source device provided in a light source device housing 525 is lighted up. A light emitted from the discharge lamp is controlled by an optical system 523 so that a light bulb 524 representing an image to be displayed is illuminated. The image formed by the light bulb 524 is synthesized by an optical synthesizing prism 519 and is changed into a projecting luminous flux 510 by means of a projection lens 501 and is thus projected onto a display surface such as a screen. When the discharge lamp is lighted up, the axial flow fan 505 is operated for cooling the discharge lamp. When the axial flow fan 505 has such a wing configuration that the adjacent wings 5051a and 5051b to each other overlap each other and a clearance is not provided between the wings in an orthogonal projected image obtained by orthogonal projection in a direction of a rotation axis 507 of the wing. Also in the case in which the discharge lamp bursts during lighting for some reason and a fragment thereof comes out of the light source device, the fragment of the discharge lamp is always blocked by the wings of the axial flow fan 505.

According to the projection type display device in accordance with the sixth embodiment, thus, there is mounted the axial flow fan in which the adjacent wings to each other overlap each other and the clearance is not provided between the wings in the orthogonal projected image obtained by the orthogonal projection in the direction of the rotation axis of the wing. Also in the case in which the fragment of the discharge lamp generated by the burst comes out of the light source device, therefore, the fragment does not come out of the projection type display device so that reliability and safety of the projection type display device can be enhanced remarkably.

While the structure in which three light bulbs 524 are mounted as the projection type display device has been illustrated in the above description, a quantity is not particularly restricted but any quantity may be employed. Moreover, any of a transmission type device and a reflection type device may be used as the light bulb 524.

Seventh Embodiment

For the light source device to be mounted on the projection type display device according to the sixth embodiment shown in FIG. 11, there is employed a light source device comprising any of the cutoff valve mechanism described in each of the first to fourth embodiments and the cutoff valve mechanism described in each of the eighth to tenth embodiments which will be described below.

According to the projection type display device in accordance with the seventh embodiment, a countermeasure for preventing a fragment from being scattered is taken for both the light source device and the projection type display device. Even if the cutoff valve mechanism provided in the light source device causes an operation failure, therefore, a fragment does not come out but reliability and safety of the projection type display device can be enhanced very highly.

Eighth Embodiment

Figure 13:
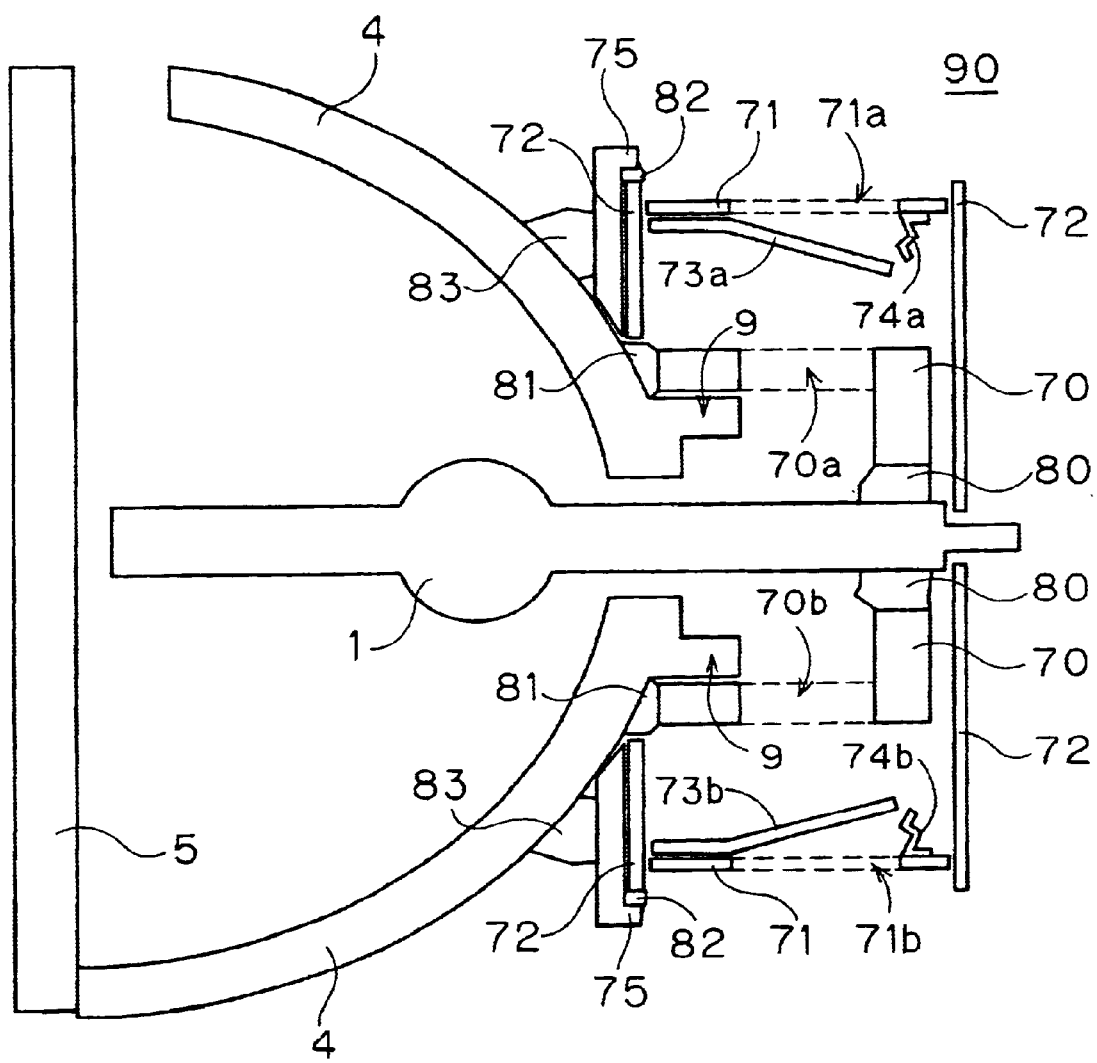
FIG. 13 is a sectional view showing a structure of a light source device according to an eighth embodiment of the present invention.

FIG. 13 is a sectional view showing a structure of a light source device according to an eighth embodiment of the present invention. In FIG. 13, the cutoff valve mechanism 45 and the feeder 3 which are shown in FIG. 1 are omitted. A discharge lamp 1 is provided in an internal space of a concave reflecting mirror 4. The discharge lamp 1 and the concave reflecting mirror 4 are positioned and fixed to each other through a lamp base 70. More specifically, the lamp base 70 is fixed to the discharge lamp 1 with an adhesive 80 and is fixed to an external surface of the concave reflecting mirror 4 with an adhesive 81. The lamp base 70 is provided with vent holes 70a and 70b which are spatially connected to the internal space of the concave reflecting mirror 4.

A pedestal 75 is fixed to the external surface of the concave reflecting mirror 4 with an adhesive 83. Moreover, a box-shaped cutoff valve mechanism 90 is fixed to the pedestal 75 with an adhesive 82. The lamp base 70 is provided in an internal space of the cutoff valve mechanism 90.

Figure 14:
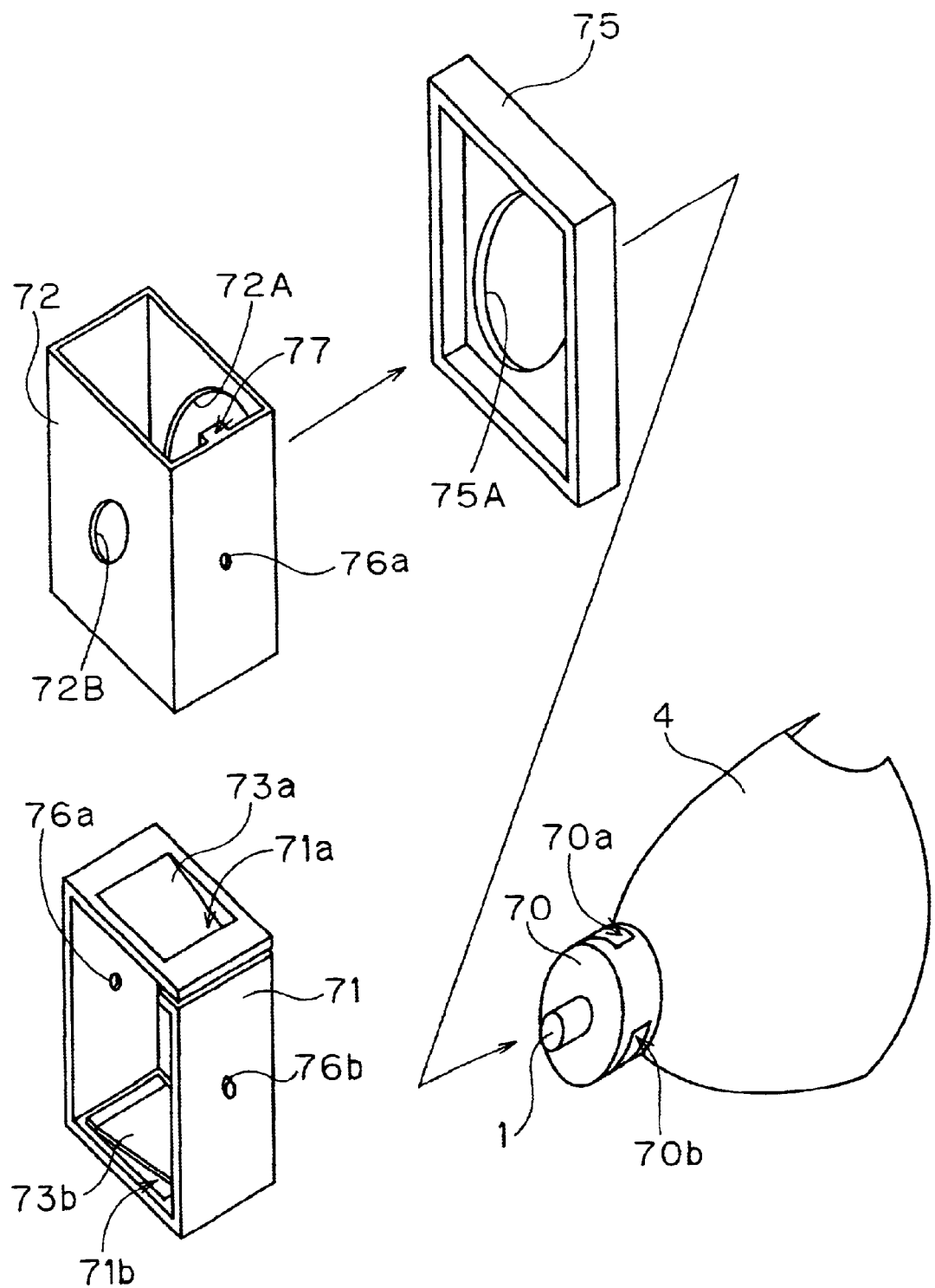
FIG. 14 is a perspective view showing a step of assembling the light source device according to the eighth embodiment of the present invention.

FIG. 14 is a perspective view showing a step of assembling the light source device according to the eighth embodiment. Also in FIG. 14, the cutoff valve mechanism 45 and the feeder 3 which are shown in FIG. 1 are omitted. The cutoff valve mechanism 90 includes a cylindrical member 72 having an upper surface and a bottom surface opened respectively, and a frame-shaped member 71 formed by bending a flat plate so as to be fitted in the member 72. A front surface and a rear surface of the member 72 are provided with openings 72A and 72B, respectively. By inserting the member 71 from the bottom surface of the member 72, the box-shaped cutoff valve mechanism 90 is constituted. The upper surface of the member 72 is provided with a protruded stopper 77, and the insertion of the member 71 is stopped by the stopper 77 so that relative positions of the member 72 and the member 71 are defined. Moreover, a hole 76a and a projection 76b are formed on side surfaces of the members 72 and 71, respectively. When the member 71 is inserted in the member 72, the projection 76b is fitted in the hole 76a so that the members 71 and 72 are engaged with each other. The projection 76b may be put in and out of the side surface of the member 71 by using a spring or the like.

An opening 75A is formed on the pedestal 75, and the cutoff valve mechanism 90 is bonded to the pedestal 75 such that the openings 72A and 75A are adapted to each other. Then, the lamp base 70 is inserted through the opening 75A so that the pedestal 75 is bonded to the external surface of the concave reflecting mirror 4.

With reference to FIGS. 13 and 14, vent holes 71a and 71b connected spatially to the vent holes 70a and 70b are formed on an upper surface and a bottom surface of the member 71, respectively. Moreover, movable valves 73a and 73b and fixing clicks 74a and 74b are formed on the upper surface and the bottom surface of the member 71 in the vicinity of the vent holes 70a and 70b, respectively. During normal lighting of the discharge lamp 1, the internal space of the concave reflecting mirror 4 and an external space of the cutoff valve mechanism 90 are spatially connected to each other through the vent holes 70a, 71a, 70b and 71b. When the discharge lamp 1 bursts, the movable valves 73a and 73b are pressed by a pressure wave applied from the internal space of the concave reflecting mirror 4 so that the spatial connection is cut off. In addition, the movable valves 73a and 73b are fixed with the fixing clicks 74a and 74b in such a state that the vent holes 71a and 71b are closed, respectively.

According to the light source device in accordance with the eighth embodiment, thus, a fragment of the discharge lamp 1 generated by the burst can be completely enclosed in the light source device in the same manner as in the first embodiment. Accordingly, it is possible to prevent the fragment of the discharge lamp 1 from being scattered to an external space of the light source device. Thus, it is possible to remarkably enhance reliability and safety of the light source device.

By combining the frame-shaped member 71 and the cylindrical member 72 which are fitted each other, moreover, it is possible to constitute the box-shaped cutoff valve mechanism 90 almost without a clearance. As compared with the case in which the box-shaped cutoff valve mechanism is to be fabricated by welding or caulking in order to fill up the clearance (corresponding to the case in which the cutoff valve mechanism 35 according to the first embodiment is to be fabricated, for example), accordingly, it is possible to decrease the number of the steps of manufacturing the light source device.

When the discharge lamp 1 is lighted up, the discharge lamp 1 itself acts as a heat source so that the discharge lamp 1 and surrounding structures (for example, the concave reflecting mirror 4 and the like) are raised to have high temperatures. In the cutoff valve mechanism 90 according to the eighth embodiment, the movable valves 73a and 73b are provided in the vicinity of the vent holes 71a and 71b for cooling. For this reason, an amount of air for ventilating the inside and outside of the device through the vent holes 71a and 71b is decreased. As a result, a cooling efficiency of the light source device is reduced.

Therefore, it is desirable that at least one of the members 71 and 72 and the pedestal 75 should be constituted by a metal material such as aluminum. Consequently, the members 71 and 72 and the pedestal 75 act as radiating plates. Thus, it is possible to improve the cooling effect of the light source device. In this case, it is possible to further enhance the cooling efficiency by increasing thicknesses or surface areas of the members 71 and 72 and the pedestal 75. By forming, of a metal material, the cutoff valve mechanisms 35 and 45 according to the first embodiment, the cutoff valve mechanism 55 according to the third embodiment and the cutoff valve mechanism 65 according to the fourth embodiment, it is also possible to obtain the same effects.

On the other hand, the concave reflecting mirror 4 is constituted by a glass. For this reason, in the case in which a calorific value of the discharge lamp 1 is great, there is a possibility that a bonded surface of a metal and a glass might be thermally distorted due to a difference in a coefficient of thermal expansion and the adhesives 81 and 83 might be thereby peeled if both the members 71 and 72 and the pedestal 75 are constituted by metal materials. Therefore, at least one of the members 71 and 72 may be constituted by a metal material and the pedestal 75 may be constituted by ceramic. A coefficient of thermal expansion of the ceramic (typically steatite $8.0 \times 10^{-6}/°$ C.) is greater than that of the glass (crystallized glass: $1.1 \times 10^{-6}/°$ C.) and is smaller than that of the metal (stainless SUS304: $13.6 \times 10^{-6}/°$ C., aluminum A1100: $13.6 \times 10^{-6}/°$ C.). By such a structure, accordingly, the pedestal 75 can act as a buffer to prevent or suppress the peeling of the adhesives 81 and 83 which is caused by the difference in the coefficient of thermal expansion between the metal and the glass. Consequently, it is possible to enhance the reliability of the light source device.

Ninth Embodiment

Figure 15:
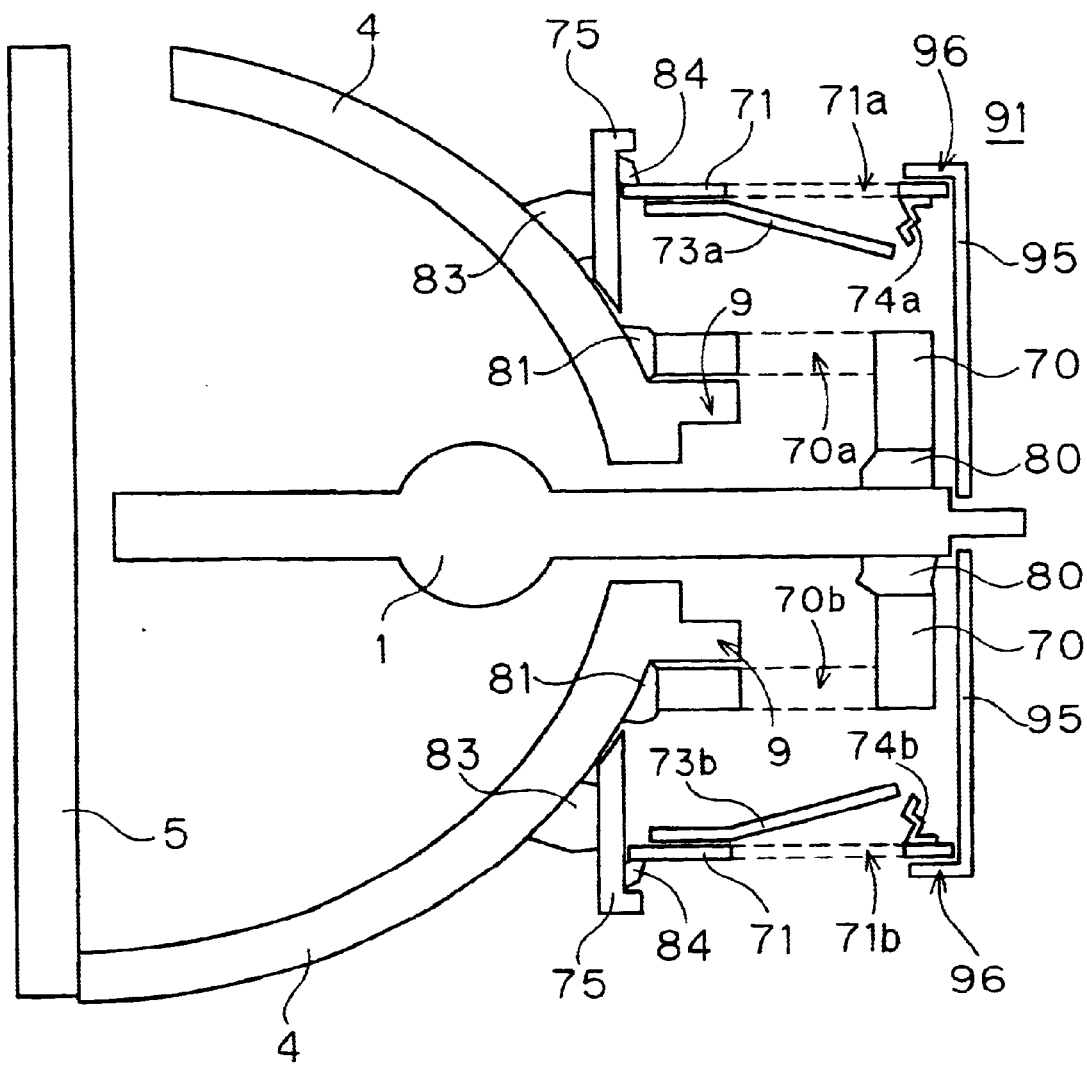
FIG. 15 is a sectional view showing a structure of a light source device according to a ninth embodiment of the present invention.
Figure 16:
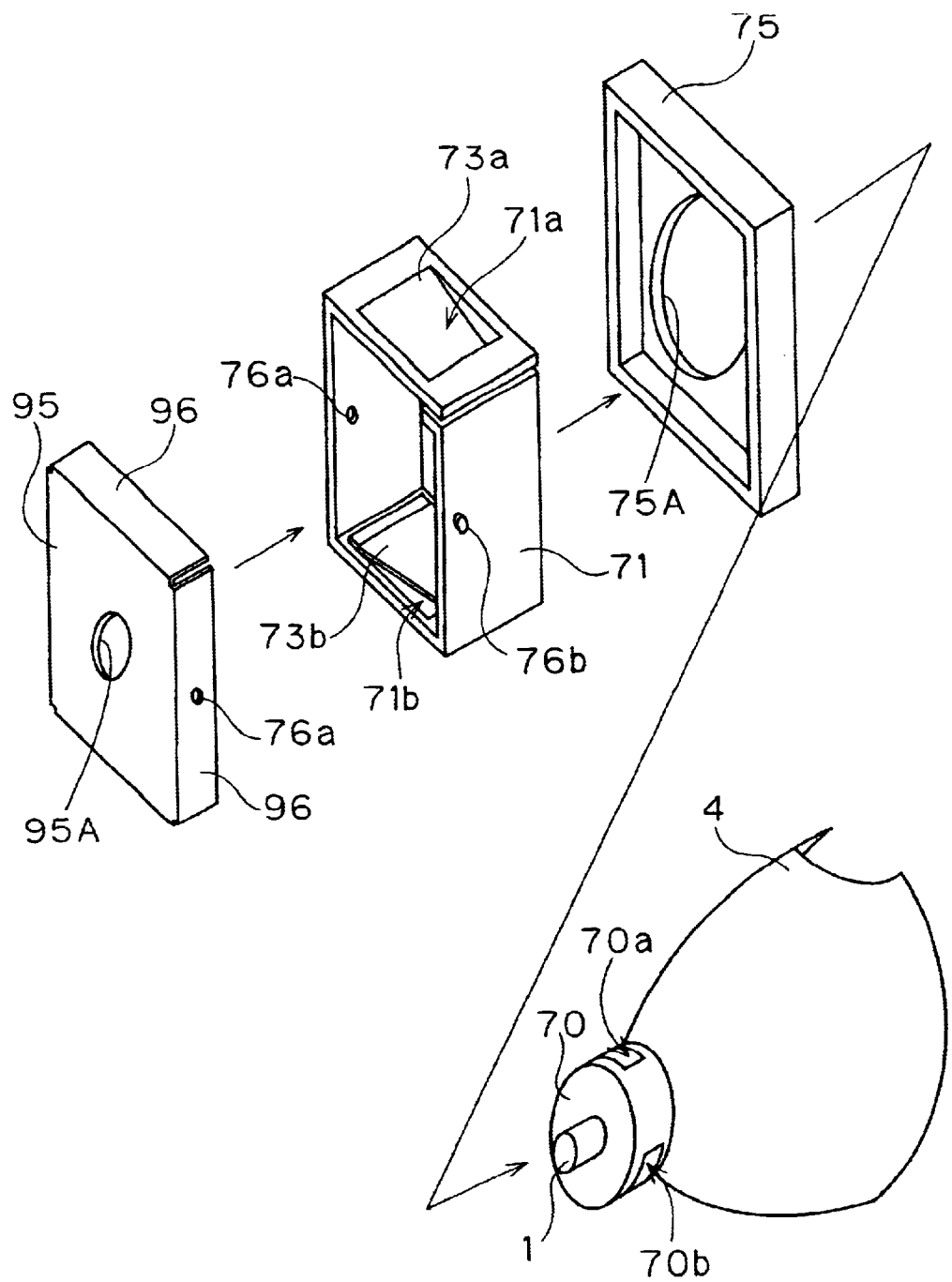
FIG. 16 is a perspective view showing a step of assembling the light source device according to the ninth embodiment of the present invention.

FIG. 15 is a sectional view showing a structure of a light source device according to a ninth embodiment of the present invention, and FIG. 16 is a perspective view showing a step of assembling the light source device according to the ninth embodiment. In FIGS. 15 and 16, the cutoff valve mechanism 45 and the feeder 3 which are shown in FIG. 1 are omitted. In the eighth embodiment, the box-shaped cutoff valve mechanism 90 is constituted by inserting the frame-shaped member 71 into the cylindrical member 72. On the other hand, in the light source device according to the ninth embodiment shown in FIGS. 15 and 16, a cover member 95 is put on an opened rear surface of a frame-shaped member 71 so that a box-shaped cutoff valve mechanism 91 having an opened front surface is constituted. The cover member 95 is formed by bending a flat plate so as to be fitted in the frame shape of the member 71, and has a main surface and a plurality of bulged surfaces 96 connected thereto. As shown in FIG. 15, the bulged surface 96 covers an end of the member 71.

The main surface of the cover member 95 is provided with an opening 95A through which a discharge lamp 1 is to be inserted by assembly. When the cover member 95 is to be put on the rear surface of the member 71, the member 71 collides with the main surface of the cover member 95 so that relative positions of the member 71 and the cover member 95 are defined. Moreover, a side surface of the member 71 and the bulged surface 96 of the cover member 95 are provided with a projection 76b and a hole 76a which serve to engage the member 71 and the cover member 95 with each other.

According to the light source device in accordance with the ninth embodiment, thus, it is also possible to obtain the same effects as those in the eighth embodiment by putting the cover member 95 on the rear surface of the frame-shaped member 71 to constitute the box-shaped cut-off valve mechanism 91.

In addition, in the cutoff valve mechanism 91 according to the ninth embodiment, the bulged surface 96 of the cover member 95 covers a periphery of the end of the member 71. Therefore, it is possible to obtain the higher effect of preventing a fragment of the discharge lamp 1 from coming out of a clearance between members than that of the cutoff valve mechanism 90 according to the eighth embodiment.

In the same manner as in the eighth embodiment, at least one of the member 71, the cover member 95 and a pedestal 75 may be constituted by a metal material. Moreover, at least one of the member 71 and the cover member 95 may be constituted by a metal material and the pedestal 75 may be constituted by ceramic.

Tenth Embodiment

Figure 17:
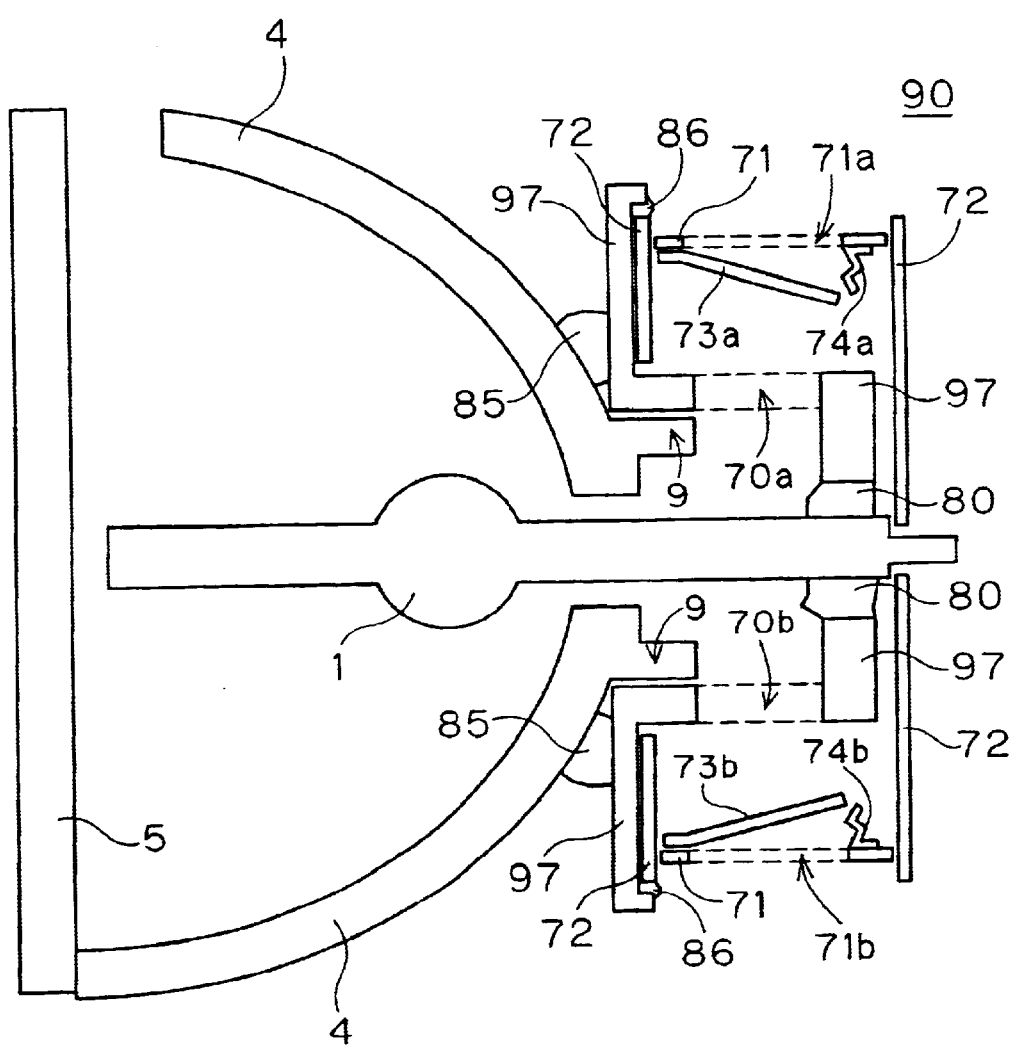
FIG. 17 is a sectional view showing a structure of a light source device according to a tenth embodiment of the present invention.
Figure 18:
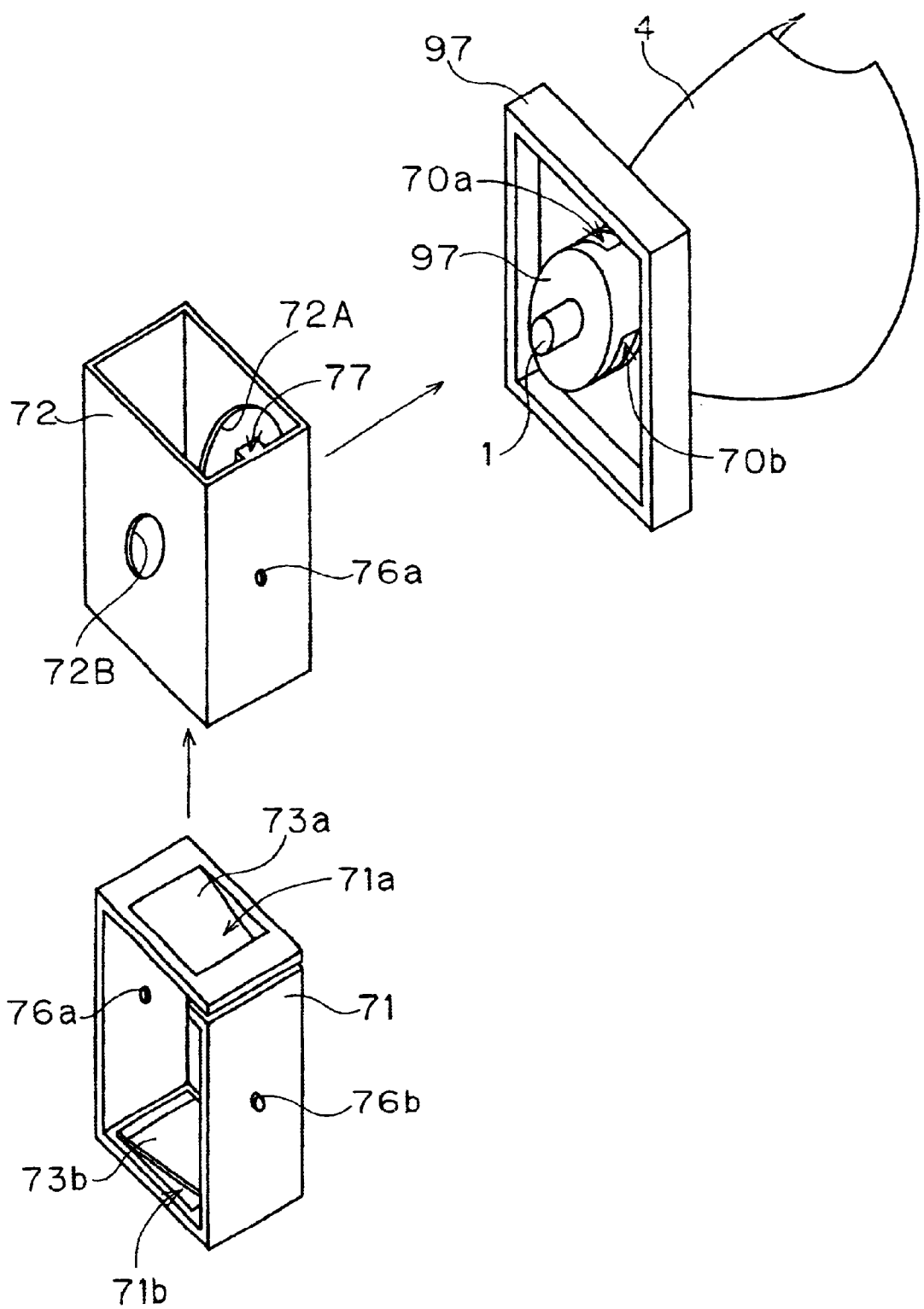
FIG. 18 is a perspective view showing a step of assembling the light source device according to the tenth embodiment of the present invention.

FIG. 17 is a sectional view showing a structure of a light source device according to a tenth embodiment of the present invention, and FIG. 18 is a perspective view showing a step of assembling the light source device according to the tenth embodiment. In FIGS. 17 and 18, the cutoff valve mechanism 45 and the feeder 3 which are shown in FIG. 1 are omitted. In the light source device according to the eighth embodiment, the pedestal 75 and the lamp base 70 are provided as separate members. On the other hand, in the light source device according to the tenth embodiment shown in FIG. 17, the pedestal 75 and the lamp base 70 are not provided but a member 97 having these members formed as an integral structure is provided. The member 97 is fixed to a discharge lamp 1 with an adhesive 80, and furthermore, is fixed to an external surface of a concave reflecting mirror 4 with an adhesive 85. A member 72 of a cutoff valve mechanism 90 is fixed to the member 97 with an adhesive 86.

According to the light source device in accordance with the tenth embodiment, thus, the number of components can be more decreased by using the member 97 having the integral structure as compared with the eighth embodiment. As a result, it is also possible to reduce the number of the steps of assembling the light source device.

In the light source device according to the ninth embodiment, the same effects as described above can also be obtained by using the member 97 having the integral structure in place of the pedestal 75 and the lamp base 70.

While the invention has been shown and described in detail, the foregoing description is in all aspects illustrative and not restrictive. It is therefore understood that numerous modifications and variations can be devised without departing from the scope of the invention.

What is claimed is:

1. A light source device comprising:
   a discharge lamp;
   a container provided to surround said discharge lamp and partially having a translucent light emitting surface;
   a first vent hole provided in said container; and
   a cutoff mechanism provided in the vicinity of said first vent hole which has a movable member for being pressed by a pressure wave applied from an internal space of said container to cut off a spatial connection of said internal space and an external space through said first vent hole.

2. The light source device according to claim 1, wherein said cutoff mechanism further includes:
   a housing having a second vent hole for spatially connecting said external space to said first vent hole; and
   a fixing click formed on an internal surface of said housing,
   said movable member is pressed by said pressure wave, thereby closing said second vent hole; and
   said fixing click fixes said movable member in such a state that said movable member closes said second vent hole.

3. The light source device according to claim 1, further comprising a box member which is provided to surround said container excluding said light emitting surface and has an opening to be matched with said first vent hole,
   said cutoff mechanism being provided on said box member in a portion in which said opening is formed.

4. The light source device according to claim 1, wherein said cutoff mechanism further includes a housing having a second vent hole for spatially connecting said external space to said first vent hole,
   said movable member is pressed by said pressure wave and a main surface of said movable member thereby closes said second vent hole; and
   said movable member is provided in said housing without an outer periphery of said main surface coming in contact with said housing and said main surface opposed to said second vent hole in a prior state to said pressing caused by said pressure wave.

5. The light source device according to claim 1, wherein said container is provided with a plurality of first vent holes, and
   said cutoff mechanism is provided corresponding to each of said first vent holes.

6. A light source device comprising:
   a discharge lamp;
   a concave reflecting mirror disposed with said discharge lamp provided therein;
   a fixing member having a first vent hole to be spatially connected to an internal space of said concave reflecting mirror and serving to position and fix said discharge lamp and said concave reflecting mirror to each other;
   a box member which has a second vent hole to be spatially connected to said first vent hole and is disposed with said fixing member provided therein, and
   a movable member which is provided in said box member in the vicinity of said second vent hole and is pressed by a pressure wave applied from said internal space, thereby cutting off a spatial connection of said internal space and an external space of said box member through said first and second vent holes.

7. The light source device according to claim 6, further comprising a fixing click formed on an internal surface of said box member,
   said movable member being pressed by said pressure wave to close said second vent hole, and
   said fixing click fixing said movable member in such a state that said movable member closes said second vent hole.

8. The light source device according to claim 6, wherein said box member has a cylindrical member having first and second opened surfaces opposed to each other; and
   a frame-shaped member to be fitted in said cylindrical member which is formed by bending a flat plate and has two surfaces corresponding to said first and second surfaces where said second vent hole and said movable member are formed respectively,
   said frame-shaped member being inserted from said first or second surface into said cylindrical member, thereby constituting said box member.

9. The light source device according to claim 6, wherein said box member includes a frame-shaped member formed by bending a flat plate and having first and second surfaces opposed to each other where said second vent hole and said movable member are formed respectively, and
   a cover member to be fitted in a frame shape of said frame-shaped member,
   said cover member being put on an opening surface of said frame-shaped member defined by said frame shape, thereby constituting said box member.

10. The light source device according to claim 6, further comprising a pedestal for fixing said concave reflecting mirror and said box member to each other,
    at least one of said box member and said pedestal being constituted by a metal.

11. The light source device according to claim 6, further comprising a pedestal provided between said concave reflecting mirror and said box member,
    said pedestal being constituted by a material having a coefficient of thermal expansion between that of a material of said concave reflecting mirror and that of a material of said box member.

12. The light source device according to claim 11, wherein said material of said concave reflecting mirror is a glass, said material of said box member is a metal and said material of said pedestal is ceramic.

13. The light source device according to claim 10, wherein said fixing member and said pedestal are formed as an integral structure.

14. The light source device according to claim 11, wherein said fixing member and said pedestal are formed as an integral structure.

15. A projection type display device comprising:
    a light source device;
    a light bulb representing an image to be displayed;

an optical system for irradiating a light emitted from said light source device on said light bulb; and a projection lens for projecting, onto a display surface, said image of said light bulb on which said light is irradiated, said light source device including:

a discharge lamp;

a container provided to surround said discharge lamp and partially having a translucent light emitting surface;

a first vent hole provided in said container; and a cutoff mechanism provided in the vicinity of said first vent hole which has a movable member for being pressed by a pressure wave applied from an internal space of said container to cut off a spatial connection of said internal space and an external space through said first vent hole.

16. The projection type display device according to claim 15, further comprising:

a housing for accommodating at least said light source device therein; and an axial flow fan provided in said housing and having a plurality of wings arranged around a rotation axis, said axial flow fan having such a wing configuration that a clearance is not provided between said wings which are adjacent to each other in an orthogonal projected image obtained by orthogonal projection in a direction of said rotation axis.

17. A projection type display device comprising:

a light source device;

a light bulb representing an image to be displayed;

an optical system for irradiating a light emitted from said light source device on said light bulb; and a projection lens for projecting, onto a display surface, said image of said light bulb on which said light is irradiated, said light source device including:

a discharge lamp;

a concave reflecting mirror disposed with said discharge lamp provided therein;

a fixing member having a first vent hole to be spatially connected to an internal space of said concave reflecting mirror and serving to position and fix said discharge lamp and said concave reflecting mirror to each other;

a box member which has a second vent hole to be spatially connected to said first vent hole and is disposed with said fixing member provided therein, and a movable member which is provided in said box member in the vicinity of said second vent hole and is pressed by a pressure wave applied from said internal space, thereby cutting off a spatial connection of said internal space and an external space of said box member through said first and second vent holes.

18. The projection type display device according to claim 17, further comprising:

a housing for accommodating at least said light source device therein; and an axial flow fan provided in said housing and having a plurality of wings arranged around a rotation axis, said axial flow fan having such a wing configuration that a clearance is not provided between said wings which are adjacent to each other in an orthogonal projected image obtained by orthogonal projection in a direction of said rotation axis.

19. A projection type display device comprising:

a light source device having a discharge lamp;

a light bulb representing an image to be displayed;

an optical system for irradiating a light emitted from said light source device on said light bulb;

a projection lens for projecting, onto a display surface, said image of said light bulb on which said light is irradiated, a housing for accommodating at least said light source device therein; and an axial flow fan provided in said housing and having a plurality of wings arranged around a rotation axis, said axial flow fan having such a wing configuration that a clearance is not provided between said wings which are adjacent to each other in an orthogonal projected image obtained by orthogonal projection in a direction of said rotation axis.

20. The projection type display device according to claim 19, wherein said light source device further includes:

a container provided to surround said discharge lamp and partially having a translucent light emitting surface;

a vent hole provided in said container; and a cutoff mechanism provided in the vicinity of said vent hole which has a movable member for being pressed by a pressure wave applied from an internal space of said container to cut off a spatial connection of said internal space and an external space through said vent hole.

* * * * *